(12) United States Patent
Song et al.

(10) Patent No.: US 12,483,370 B2
(45) Date of Patent: Nov. 25, 2025

(54) METHOD FOR MONITORING CONTROL CHANNELS AND DETERMINING TRANSMISSION CONFIGURATION INDICATION, AND TERMINAL

(71) Applicant: DATANG MOBILE COMMUNICATIONS EQUIPMENT CO., LTD., Beijing (CN)

(72) Inventors: Lei Song, Beijing (CN); Runhua Chen, Beijing (CN); Qiubin Gao, Beijing (CN); Xin Su, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 380 days.

(21) Appl. No.: 18/020,200

(22) PCT Filed: Jul. 6, 2021

(86) PCT No.: PCT/CN2021/104815
§ 371 (c)(1),
(2) Date: Feb. 7, 2023

(87) PCT Pub. No.: WO2022/028191
PCT Pub. Date: Feb. 10, 2022

(65) Prior Publication Data
US 2023/0299918 A1    Sep. 21, 2023

(30) Foreign Application Priority Data

Aug. 7, 2020 (CN) .......... 202010790474.6
May 11, 2021 (CN) .......... 202110513672.2

(51) Int. Cl.
H04L 5/00 (2006.01)

(52) U.S. Cl.
CPC .......... *H04L 5/0051* (2013.01); *H04L 5/0035* (2013.01)

(58) Field of Classification Search
None
See application file for complete search history.

(56) References Cited

U.S. PATENT DOCUMENTS

| 11,470,489 | B2* | 10/2022 | Islam ............... H04L 1/0026 |
| 12,245,252 | B2* | 3/2025 | Mondal ............... H04W 72/23 |
| 2019/0150124 | A1 | 5/2019 | Nogami et al. |
| 2019/0297603 | A1 | 9/2019 | Guo et al. |
| 2019/0349806 | A1* | 11/2019 | Nam ............... H04L 5/001 |

(Continued)

FOREIGN PATENT DOCUMENTS

| CN | 110474751 A | 11/2019 |
| CN | 110475262 A | 11/2019 |

(Continued)

*Primary Examiner* — Phirin Sam
(74) *Attorney, Agent, or Firm* — Meunier Carlin & Curfman LLC

(57) ABSTRACT

A method for monitoring control channels and determining a transmission configuration indication, and a terminal. In the present application, a terminal determines, according to first information, at least two CORESETs or search space sets having at least two QCL-TypeD properties, or determines, according to a control channel transmission pattern, at least two CORESETs or search space sets having an association relationship, and monitors at least two control channels according to the determined CORESETs or search space sets.

12 Claims, 7 Drawing Sheets

A terminal determines, according to first information configured by a network side device, at least two CORESETs or search space sets having at least two QCL-Type D properties, or the terminal determines, according to a control channel transmission pattern configured by the network side device, at least two CORESETs or search space sets having an association relationship — S101

The terminal monitors at least two control channels according to the at least two determined CORESETs or search space sets — S102

(56) References Cited

U.S. PATENT DOCUMENTS

| | | | |
|---|---|---|---|
| 2020/0045569 A1 | 2/2020 | Seo et al. | |
| 2020/0084752 A1* | 3/2020 | Åström | H04W 72/51 |
| 2020/0228263 A1 | 7/2020 | Khoshnevisan et al. | |
| 2020/0351892 A1* | 11/2020 | Yi | H04L 5/0092 |
| 2022/0150734 A1* | 5/2022 | Nimbalker | H04L 1/0038 |
| 2023/0164782 A1* | 5/2023 | Kim | H04L 1/08 370/329 |
| 2024/0284470 A1* | 8/2024 | Khoshnevisan | H04L 5/0053 |
| 2024/0422679 A1* | 12/2024 | Freda | H04W 52/0232 |
| 2025/0056591 A1* | 2/2025 | Zhang | H04W 72/0446 |

FOREIGN PATENT DOCUMENTS

| | | |
|---|---|---|
| CN | 110972515 A | 4/2020 |
| CN | 111314035 A | 6/2020 |
| WO | 2020198555 A1 | 10/2020 |

\* cited by examiner

A terminal determines, according to first information configured by a network side device, at least two CORESETs or search space sets having at least two QCL-Type D properties, or the terminal determines, according to a control channel transmission pattern configured by the network side device, at least two CORESETs or search space sets having an association relationship — S101

The terminal monitors at least two control channels according to the at least two determined CORESETs or search space sets — S102

Fig. 1

METHOD FOR MONITORING CONTROL CHANNELS AND DETERMINING TRANSMISSION CONFIGURATION INDICATION, AND TERMINAL

CROSS REFERENCE TO RELATED APPLICATIONS

The present application is a US National Stage of International Application No. PCT/CN2021/104815, filed on Jul. 6, 2021, which claims the priority of the Chinese patent application No. 202010790474.6 filed to the China Patent Office on Aug. 7, 2020, and entitled "METHOD FOR MONITORING CONTROL CHANNELS AND DETERMINING TRANSMISSION CONFIGURATION INDICATION, AND TERMINAL", and the Chinese patent application No. 202110513672.2 filed to the China Patent Office on May 11, 2021, and entitled "METHOD FOR MONITORING CONTROL CHANNELS AND DETERMINING TRANSMISSION CONFIGURATION INDICATION, AND TERMINAL", of which the entire contents are incorporated herein by reference.

FIELD

The present application relates to the technical field of wireless communications, in particular to a method for monitoring a control channel and determining a transmission configuration indication, and a terminal.

BACKGROUND

In a new radio (NR) system, a terminal can only monitor control channels with the same beam on one symbol. With introduction of a multi transmission point technology, a receiving capability of the terminal is also enhanced. The terminal can receive, on one symbol, data channels with different Quasi-Co-Location Type D (QCL-Type D) properties sent by two transmission points. However, the control channels that can be monitored still only have the same QCL-Type D property. In this way, when the plurality of transmission points send the plurality of control channels on the same symbol, the terminal can only receive the control channel with one QCL-Type D property, resulting in resource waste.

With the introduction of the multi transmission point technology, the terminal may receive two physical downlink shared channels (PDSCHs) with different beams on one symbol. In addition, there may be other physical channels and/or physical signals being subjected to multiplexing transmission on the same symbol with the PDSCHs. When the plurality of physical channels and/or physical signals are subjected to multiplexing transmission on the same symbol, the terminal may not be able to receive all the physical channels and/or physical signals sent by a network side device, resulting in resource waste.

To sum up, there is a problem of resource waste when the network side device sends the physical channels and/or physical signals to the terminal.

SUMMARY

The present application provides a method for monitoring a control channel and determining a transmission configuration indication, and a terminal, for solving a problem of resource waste when a network side device sends the physical channels and/or physical signals to the terminal in the prior art.

In a first aspect, an embodiment of the present application provides a method for monitoring a control channel, including:

determining, by a terminal according to first information configured by a network side device, at least two control resource sets (CORESETs) or search space sets having at least two QCL-Type D properties, or determining, by the terminal according to a control channel transmission pattern configured by the network side device, at least two CORESETs or search space sets having an association relationship; and monitoring, by the terminal, at least two control channels according to the at least two determined CORESETs or search space sets.

Optionally, the determining, by the terminal according to the first information configured by the network side device, the at least two CORESETs having the at least two QCL-Type D properties, includes:

determining, by the terminal according to the first information configured by the network side device, the at least two CORESETs having the at least two QCL-Type D properties in different CORESET groups; or determining, by the terminal according to the first information configured by the network side device, the at least two CORESETs having the at least two QCL-Type D properties in the same CORESET group;

where the CORESET group includes multiple CORESETs with the same higher-layer parameter configuration;

where the determining, by the terminal according to the first information configured by the network side device, the at least two search space sets having the at least two QCL-Type D properties, includes:

determining, by the terminal according to the first information configured by the network side device, the at least two same search space sets having the at least two QCL-Type D properties in the same CORESET; or determining, by the terminal according to the first information configured by the network side device, the at least two different search space sets having the at least two QCL-Type D properties in the same CORESET.

Optionally, the at least two determined CORESETs include:

one CORESET in a first CORESET group of a first cell and one CORESET in a second CORESET group of the first cell; or a CORESET corresponding to a search space set of a second cell and one CORESET of a first cell, where the search space set of the second cell is a search space set with a lowest search space set index in the second cell; or at least two CORESETs with different QCL-Type D properties corresponding to multiple search space sets with a lowest index; or a CORESET corresponding to one search space set of a second cell and one CORESET of a third cell, where one CORESET of the third cell corresponds to a search space set associated with the search space set of the second cell or corresponds to a search space set with a lower cell index and/or search space set index value; or a CORESET corresponding to one search space set of a fourth cell and a CORESET corresponding to one search space set of a fifth cell, where one search space set of the fourth cell is a search space set with a lowest cell index and/or search space set index value among the search space sets having the association relationship, and one search space set of the fifth cell is a search space set associated with the search space set of the fourth cell or the search space set with the lower cell index and/or search space set index value.

Optionally, the at least two determined search space sets include:
one search space set of the second cell and one search space set of the third cell, where one search space set of the third cell is the search space set associated with the search space set of the second cell or the search space set with the lower cell index and/or search space set index value; or
one search space set of the fourth cell and one search space set of the fifth cell, where one search space set of the fourth cell is the search space set with the lowest cell index and/or search space set index value among the search space sets having the association relationship, and one search space set of the fifth cell is the search space set associated with the search space set of the fourth cell or the search space set with the lower cell index and/or search space set index value.

Optionally, one search space set of the second cell includes:
the search space set with the lowest search space set index among the search space sets having the association relationship in the second cell, or the search space set with the lowest search space set index.

Optionally, one CORESET in the first CORESET group includes:
a CORESET corresponding to a UE-specific search space (USS) set or common search space (CSS) set with a lowest index in a first search space set, where the first search space set is at least one search space set associated with the first CORESET group of the first cell; and
one CORESET in the second CORESET group includes:
a CORESET corresponding to a USS set or CSS set with a lowest index in a second search space set, where the second search space set is at least one search space set associated with the second CORESET group of the first cell.

Optionally, the first cell includes:
a cell with a lowest index among cells including two different control resource set higher-layer parameter CORESETPoolIndex values; or
a cell with a highest index among cells including the two different CORESETPoolIndex values; or
all of cells including the two different CORESETPoolIndex values; or
one cell preconfigured by the network side device.

Optionally, the second cell includes:
a cell with a lowest index among cells including a CSS set; or
a cell with a lowest CSS set index or USS set index among all cells; or
a cell with a lowest index among cells including a USS set.

Optionally, the association relationship includes:
an association relationship of CORESET indexes or search space indexes or transmission configuration indication (TCI) states among CORESETs of multiple slots; or
an association relationship of CORESET indexes or search space indexes or TCI states among multiple CORESETs of the same slot.

Optionally, the method further includes:
determining, by the terminal, a CORESET or search space set with one QCL-Type D property in a case that the network side device does not configure the first information for the terminal; or
determining, by the terminal, a CORESET or search space set with one QCL-Type D property in a case that the network side device configures second information for the terminal, where the second information is configured to indicate the terminal to monitor the CORESET or search space set with one QCL-Type D property.

Optionally, the determining, by the terminal, the CORESET or search space set with one QCL-Type D property in the case that the network side device configures the second information for the terminal, includes:
determining, by the terminal, the CORESET or search space set with one QCL-Type D property according to part or all of: a cell index; CORESET group information; or a search space index.

Optionally, the control channel transmission pattern includes:
repeatedly transmitting the control channels in multiple slots, where each of the slots has a same search space or CORESETT; or
repeatedly transmitting the control channels in the CORESET, where the CORESET has at least one TCI state; or
repeatedly transmitting the control channels in the CORESET within one slot or in multiple slots, where an offset between the CORESET and the search space is a fixed value.

Optionally, the first information includes a radio resource control (RRC) signaling and/or a media access control control element (MAC CE) signaling, and the RRC signaling and/or the MAC CE signaling is configured to indicate a CORESET or search space set that can be monitored.

In a second aspect, an embodiment of the present application provides a method for determining a transmission configuration indication, including:
determining, by a terminal, configuration information configured by a network side device for determining a TCI state; and
determining, by the terminal, one or two TCI states for transmitting all physical channels and/or physical signals within one time unit according to the configuration information, where a TCI state of each of the physical channels or physical signals is at least one of the one or two TCI states.

Optionally, the physical signals include a channel state information reference signal (CSI-RS); and the one or two TCI states include part or all of:
a TCI state associated with the CSI-RS; or
a TCI state associated with a CORESET group, where the CORESET group is a CORESET group associated with the CSI-RS, or a CORESET group for triggering control signaling transmission of an aperiodic CSI-RS.

Optionally, the physical signals include a CSI-RS; and the determining, by the terminal, the one or two TCI states for transmitting all the physical channels and/or physical signals within one time unit according to the configuration information, includes:
determining, by the terminal, an association relationship between the CSI-RS and a CORESET according to the configuration information; and
determining, by the terminal, the one or two TCI states for transmitting the CSI-RS within one time unit according to the association relationship.

Optionally, the physical channels include a physical downlink control channel (PDCCH) or PDSCH, the one or two TCI states include a TCI state associated with a CORESET group, and the CORESET group is a CORESET group associated with the PDCCH or PDSCH.

Optionally, the physical channels and/or the physical signals include a CSI-RS and at least one PDCCH. The one or two TCI states include:
- a combination of TCI states of the at least one PDCCH; and/or
- a TCI state of one PDCCH in the at least one PDCCH.

Optionally, the TCI state of one PDCCH in the at least one PDCCH includes:
- a TCI state of a PDCCH sent in a CORESET group associated with the CSI-RS.

Optionally, the determining, by the terminal, the one or two TCI states includes:
- determining, by the terminal, the one or two TCI states configured according to an RRC signaling; or
- determining, by the terminal, the one or two TCI states indicated according to a downlink control information (DCI) signaling; or
- determining, by the terminal, the one or two TCI states according to a predefined rule.

Optionally, the one or two TCI states determined by the terminal according to the predefined rule includes:
- a TCI state of at least two CORESETs monitored by the terminal; or
- a TCI state of a CORESET with a lowest index among CORESETs with a search space in two CORESET groups monitored by the terminal.

Optionally, all time units in one scheduling unit have one same state or two same TCI states; or
each of time units in one scheduling unit has its own one or two TCI states.

Optionally, the time units include part or all of:
a PDCCH monitoring symbol;
a symbol with a PDSCH scheduling offset being less than a first threshold;
a symbol with a PDSCH scheduling offset being greater than or equal to a second threshold; or
symbols other than the PDCCH monitoring symbol in one scheduling unit.

In a third aspect, an embodiment of the present application provides a terminal, including a processor, a memory and a transceiver. The processor is configured to read a program in the memory and execute:
- determining, according to first information configured by a network side device, at least two CORESETs or search space sets having at least two QCL-Type D properties, or determining, according to a control channel transmission pattern configured by the network side device, at least two CORESETs or search space sets having an association relationship; and
- monitoring at least two control channels according to the at least two determined CORESETs or search space sets.

Optionally, the processor is specifically configured to:
- determine, according to the first information configured by the network side device, the at least two CORESETs having the at least two QCL-Type D properties in different CORESET groups; or
- determine, according to the first information configured by the network side device, the at least two CORESETs having the at least two QCL-Type D properties in the same CORESET group, where the CORESET group includes multiple CORESETs with the same higher-layer parameter configuration; and
- determine, according to the first information configured by the network side device, at least two same search space sets having the at least two QCL-Type D properties in the same CORESET; or
- determine, according to the first information configured by the network side device, at least two different search space sets having the at least two QCL-Type D properties in the same CORESET.

Optionally, the at least two determined CORESETs include:
- one CORESET in a first CORESET group of a first cell and one CORESET in a second CORESET group of the first cell; or
- a CORESET corresponding to a search space set of a second cell and one CORESET of the first cell, where the search space set of the second cell is a search space set with a lowest search space set index in the second cell; or
- at least two CORESETs with different QCL-Type D properties corresponding to multiple search space sets with the lowest index; or
- a CORESET corresponding to one search space set of the second cell and one CORESET of a third cell, where one CORESET of the third cell corresponds to a search space set associated with the search space set of the second cell or corresponds to a search space set with a lower cell index and/or search space set index value; or
- a CORESET corresponding to one search space set of a fourth cell and a CORESET corresponding to one search space set of a fifth cell, where one search space set of the fourth cell is a search space set with a lowest cell index and/or search space set index value among the search space sets having the association relationship, and one search space set of the fifth cell is a search space set associated with the search space set of the fourth cell or the search space set with the lower cell index and/or search space set index value.

Optionally, the at least two determined search space sets include:
- one search space set of the second cell and one search space set of the third cell, where one search space set of the third cell is the search space set associated with the search space set of the second cell or the search space set with the lower cell index and/or search space set index value; or
- one search space set of the fourth cell and one search space set of the fifth cell, where one search space set of the fourth cell is the search space set with the lowest cell index and/or search space set index value among the search space sets having the association relationship, and one search space set of the fifth cell is the search space set associated with the search space set of the fourth cell or the search space set with the lower cell index and/or search space set index value.

Optionally, one search space set of the second cell includes:
- the search space set with the lowest search space set index among the search space sets having the association relationship in the second cell, or the search space set with the lowest search space set index.

Optionally, one CORESET in the first CORESET group includes:
- a CORESET corresponding to a USS set or CSS set with a lowest index in a first search space set, where the first search space set is at least one search space set associated with the first CORESET group of the first cell; and one CORESET in the second CORESET group includes:
a CORESET corresponding to a USS set or CSS set with a lowest index in a second search space set, where the second search space set is at least one search space set associated with the second CORESET group of the first cell.

Optionally, the first cell includes:
a cell with a lowest index among cells including two different CORESETPoolIndex values; or
a cell with a highest index among cells including two different CORESETPoolIndex values; or
all of cells including two different CORESETPoolIndex values; or
one cell preconfigured by the network side device.

Optionally, the second cell includes:
a cell with a lowest index among cells including a CSS set; or
a cell with a lowest CSS set index or USS set index among all cells; or
a cell with a lowest index among cells including a USS set.

Optionally, the association relationship includes:
an association relationship of CORESET indexes or search space indexes or TCI states among CORESETs of multiple slots; or
an association relationship of CORESET indexes or search space indexes or TCI states among multiple CORESETs of the same slot.

Optionally, the processor is specifically configured to:
determine a CORESET or search space set with one QCL-Type D property in a case that the network side device does not configure the first information for the terminal; or
determine a CORESET or search space set with one QCL-Type D property in a case that the network side device configures second information for the terminal, where the second information is configured to indicate the terminal to monitor the CORESET or search space set with one QCL-Type D property.

Optionally, in the case that the network side device configures the second information for the terminal, the processor is specifically configured to:
determine the CORESET or search space set with one QCL-Type D property according to part or all of: a cell index; CORESET group information; or a search space index.

Optionally, the control channel transmission pattern includes:
repeatedly transmitting the control channels in multiple slots, where each of the slots has a same search space or CORESET; or
repeatedly transmitting the control channels in the CORESET, where the CORESET has at least one TCI state; or
repeatedly transmitting the control channels in the CORESET within one slot or in multiple slots, where an offset between the CORESET and the search space is a fixed value.

Optionally, the first information includes an RRC signaling and/or an MAC CE signaling, and the RRC signaling and/or the MAC CE signaling is configured to indicate a CORESET or search space set that can be monitored.

In a fourth aspect, an embodiment of the present application provides another terminal, including a processor, a memory and a transceiver. The processor is configured to read a program in the memory and execute:
determining configuration information configured by a network side device for determining a TCI state; and
determining one or two TCI states for transmitting all physical channels and/or physical signals within one time unit according to the configuration information, where a TCI state of each of the physical channels or physical signals is at least one of the one or two TCI states.

Optionally, the physical signals include a CSI-RS; and the one or two TCI states include part or all of:
a TCI state associated with the CSI-RS; or
a TCI state associated with a CORESET group, where the CORESET group is a CORESET group associated with the CSI-RS, or a CORESET group for triggering control signaling transmission of an aperiodic CSI-RS.

Optionally, the physical channels include a PDCCH or PDSCH, the one or two TCI states include a TCI state associated with a CORESET group, and the CORESET group is a CORESET group associated with the PDCCH or PDSCH.

Optionally, the physical signals include a CSI-RS, and the processor is specifically configured to:
determine an association relationship between the CSI-RS and a CORESET according to the configuration information; and
determine the one or two TCI states for transmitting the CSI-RS within one time unit according to the association relationship.

Optionally, the physical channels and/or the physical signals include a CSI-RS and at least one PDCCH. The one or two TCI states include:
a combination of TCI states of the at least one PDCCH; and/or
a TCI state of one PDCCH in the at least one PDCCH.

Optionally, the TCI state of one PDCCH in the at least one PDCCH includes:
a TCI state of a PDCCH sent in a CORESET group associated with the CSI-RS.

Optionally, the one or two TCI states determined by the terminal include:
the one or two TCI states, determined by the terminal, configured according to an RRC signaling; or
the one or two TCI states, determined by the terminal, indicated according to a DCI signaling; or
the one or two TCI states determined by the terminal according to a predefined rule.

Optionally, the one or two TCI states determined according to the predefined rule includes:
a TCI state of at least two CORESETs monitored; or
a TCI state of a CORESET with a lowest index among CORESETs with a search space in two CORESET groups monitored.

Optionally, all time units in one scheduling unit have one same state or two same TCI states; or
each of time units in one scheduling unit has its own one or two TCI states.

Optionally, the time units include part or all of:
a PDCCH monitoring symbol;
a symbol with a PDSCH scheduling offset being less than a first threshold;
a symbol with a PDSCH scheduling offset being greater than or equal to a second threshold; or
symbols other than the PDCCH monitoring symbol in one scheduling unit.

In a fifth aspect, an embodiment of the present application provides an apparatus for monitoring a control channel, including:
- a first determining module, configured to determine, according to first information configured by a network side device, at least two CORESETs or search space sets having at least two QCL-Type D properties, or determine, according to a control channel transmission pattern configured by the network side device, at least two CORESETs having an association relationship; and
- a monitoring module, configured to monitor at least two control channels according to the at least two determined CORESETs or search space sets.

Optionally, the first determining module is configured to:
determine, according to the first information configured by the network side device, the at least two CORESETs having the at least two QCL-Type D properties in different CORESET groups; or
- determine, according to the first information configured by the network side device, the at least two CORESETs having the at least two QCL-Type D properties in the same CORESET group, where the CORESET group includes multiple CORESETs with the same higher-layer parameter configuration; and
- determine, according to the first information configured by the network side device, the at least two same search space sets having the at least two QCL-Type D properties in the same CORESET; or
- determine, according to the first information configured by the network side device, the at least two different search space sets having the at least two QCL-Type D properties in the same CORESET.

Optionally, the at least two determined CORESETs include:
- one CORESET in a first CORESET group of a first cell and one CORESET in a second CORESET group of the first cell; or
- a CORESET corresponding to a search space set of a second cell and one CORESET of the first cell, where the search space set of the second cell is a search space set with a lowest search space set index in the second cell; or
- at least two CORESETs with different QCL-Type D properties corresponding to multiple search space sets with the lowest index; or
- a CORESET corresponding to one search space set of the second cell and one CORESET of a third cell, where one CORESET of the third cell corresponds to a search space set associated with the search space set of the second cell or corresponds to a search space set with a lower cell index and/or search space set index value; or
- a CORESET corresponding to one search space set of a fourth cell and a CORESET corresponding to one search space set of a fifth cell, where one search space set of the fourth cell is a search space set with a lowest cell index and/or search space set index value among the search space sets having the association relationship, and one search space set of the fifth cell is a search space set associated with the search space set of the fourth cell or the search space set with the lower cell index and/or search space set index value.

Optionally, the at least two determined search space sets include:
- one search space set of the second cell and one search space set of the third cell, where one search space set of the third cell is the search space set associated with the search space set of the second cell or the search space set with the lower cell index and/or search space set index value; or
- one search space set of the fourth cell and one search space set of the fifth cell, where one search space set of the fourth cell is the search space set with the lowest cell index and/or search space set index value among the search space sets having the association relationship, and one search space set of the fifth cell is the search space set associated with the search space set of the fourth cell or the search space set with the lower cell index and/or search space set index value.

Optionally, one search space set of the second cell includes:
- the search space set with the lowest search space set index among the search space sets having the association relationship in the second cell, or the search space set with the lowest search space set index.

Optionally, one CORESET in the first CORESET group includes:
- a CORESET corresponding to a USS set or CSS set with a lowest index in a first search space set, where the first search space set is at least one search space set associated with the first CORESET group of the first cell; and one CORESET in the second CORESET group includes:
- a CORESET corresponding to a USS set or CSS set with a lowest index in a second search space set, where the second search space set is at least one search space set associated with the second CORESET group of the first cell.

Optionally, the first cell includes:
- a cell with a lowest index among cells including two different CORESETPoolIndex values; or
- a cell with a highest index among cells including two different CORESETPoolIndex values; or
- all of cells including two different CORESETPoolIndex values; or
- one cell preconfigured by the network side device.

Optionally, the second cell includes:
- a cell with a lowest index among cells including a CSS set; or
- a cell with a lowest CSS set index or USS set index among all cells; or
- a cell with a lowest index among cells including a USS set.

Optionally, the association relationship includes:
- an association relationship of CORESET indexes or search space indexes or TCI states among CORESETs of multiple slots; or
- an association relationship of CORESET indexes or search space indexes or TCI states among multiple CORESETs of the same slot.

Optionally, the first determining module is further configured to:
- determine a CORESET or search space set with one QCL-Type D property in a case that the network side device does not configure the first information for the terminal; or
- determine a CORESET or search space set with one QCL-Type D property in a case that the network side device configures second information for the terminal, where the second information is configured to indicate the terminal to monitor the CORESET or search space set with one QCL-Type D property.

Optionally, in the case that the network side device configures the second information for the terminal, the first determining module is specifically configured to:

determine the CORESET or search space set with one QCL-Type D property according to part or all of: a cell index; CORESET group information; or a search space index.

Optionally, the control channel transmission pattern includes:

repeatedly transmitting the control channels in multiple slots, where each of the slots has a same search space or CORESET; or repeatedly transmitting the control channels in the CORESET, where the CORESET has at least one TCI state; or repeatedly transmitting the control channels in the CORESET within one slot or in multiple slots, where an offset between the CORESET and the search space is a fixed value.

Optionally, the first information includes an RRC signaling and/or an MAC CE signaling, and the RRC signaling and/or the MAC CE signaling is configured to indicate a CORESET or search space set that can be monitored.

In a sixth aspect, an embodiment of the present application provides an apparatus for determining a transmission configuration indication, including:

a second determining module, configured to determine configuration information configured by a network side device for determining a TCI state; and a third determining module, configured to determine one or two TCI states for transmitting all physical channels and/or physical signals within one time unit according to the configuration information, where a TCI state of each of the physical channels or physical signals is at least one of the one or two TCI states.

Optionally, the physical signals include a CSI-RS; and the one or two TCI states include part or all of:

a TCI state associated with the CSI-RSs; or a TCI state associated with a CORESET group, where the CORESET group is a CORESET group associated with the CSI-RS, or a CORESET group for triggering control signaling transmission of an aperiodic CSI-RS.

Optionally, the physical signals include a CSI-RS; and the third determining module is specifically configured to:

determine an association relationship between the CSI-RS and a CORESET according to the configuration information; and determine the one or two TCI states for transmitting the CSI-RS within one time unit according to the association relationship.

Optionally, the physical channels include a PDCCH or PDSCH, the one or two TCI states include a TCI state associated with a CORESET group, and the CORESET group is a CORESET group associated with the PDCCH or PDSCH.

Optionally, the physical channels and/or the physical signals include a CSI-RS and at least one PDCCH. The one or two TCI states include:

a combination of TCI states of the at least one PDCCH; and/or a TCI state of one PDCCH in the at least one PDCCH.

Optionally, the TCI state of one PDCCH in the at least one PDCCH includes:

a TCI state of a PDCCH sent in a CORESET group associated with the CSI-RSs.

Optionally, the one or two TCI states determined by the terminal include:

the one or two TCI states, determined by the terminal, configured according to an RRC signaling; or the one or two TCI states, determined by the terminal, indicated according to a DCI signaling; or the one or two TCI states determined by the terminal according to a predefined rule.

Optionally, the one or two TCI states determined according to the predefined rule includes:

a TCI state of at least two CORESETs monitored; or a TCI state of a CORESET with a lowest index among CORESETs with a search space in two CORESET groups monitored.

Optionally, all time units in one scheduling unit have one same state or two same TCI states; or each of time units in one scheduling unit has its own one or two TCI states.

Optionally, the time units include part or all of:

a PDCCH monitoring symbol;

a symbol with a PDSCH scheduling offset being less than a first threshold;

a symbol with a PDSCH scheduling offset being greater than or equal to a second threshold; or symbols other than the PDCCH monitoring symbol in one scheduling unit.

In a seventh aspect, an embodiment of the present application provides a computer storage medium, where the computer storage medium stores a computer program instruction, and the instruction, when run on a computer, causes the computer to execute the method according to any one of the above first aspect, or the method according to any one of the above second aspect.

According to the embodiments of the present application, on the one hand, the terminal determines, according to the first information configured by the network side device, the at least two CORESETs having the at least two QCL-Type D properties, or the terminal determines, according to the control channel transmission pattern configured by the network side device, the at least two CORESETs or search space sets having the association relationship; and the terminal monitors the at least two control channels according to the at least two determined CORESETs or search space sets. The at least two CORESETs or search space sets determined by the terminal have the at least two QCL-Type D properties, or have the association relationship, therefore the CORESETs or search space sets monitored by the terminal have the different QCL-Type D properties, so that the terminal can receive the control channels sent by the plurality of transmission points on the same symbol, thereby reducing resource waste and further improving system performance. On the other hand, the terminal first determines the configuration information configured by the network side device for determining the TCI state, and then determines the one or two TCI states for transmitting all the physical channels and/or physical signals within one time unit according to the configuration information, where the TCI state of each physical channel or physical signal is at least one of the one or two TCI states. Since the terminal has determined the one or two TCI states, it may not exceed a receiving capability of the terminal to avoid the terminal being unable to effectively receive the physical channels and/or the physical signals, further reducing the resource waste and improving the system performance.

BRIEF DESCRIPTION OF THE DRAWINGS

In order to illustrate the technical solutions in the embodiments of the present application more clearly, drawings needing to be used in description of the embodiments will be introduced below briefly. Obviously, the drawings in the following description are only some embodiments of the present application, those skilled in the art can further obtain other drawings according to these drawings without inventive efforts.

FIG. 1 is a flow diagram of a method for monitoring a control channel provided by an embodiment of the present application.

DETAILED DESCRIPTION OF THE EMBODIMENTS

Figure 2:
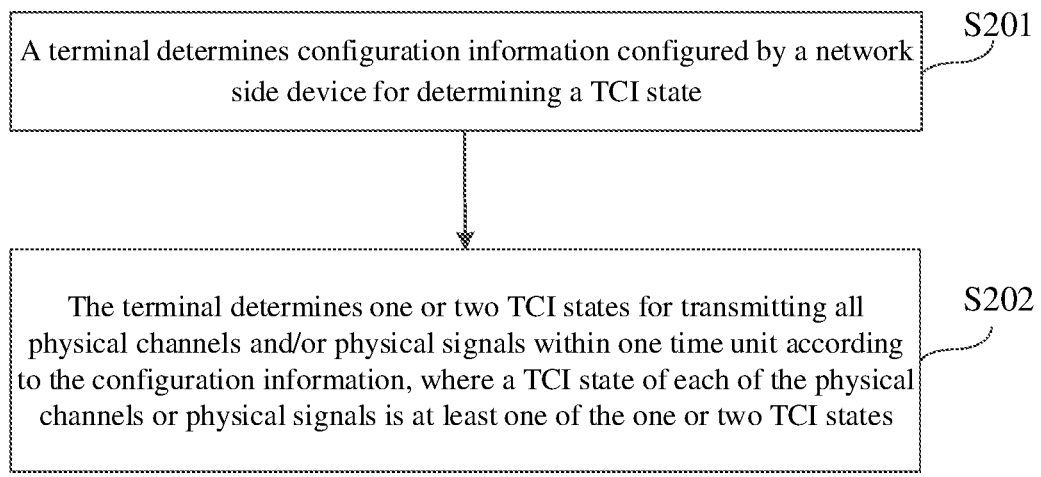
FIG. 2 is a flow diagram of a method for determining a transmission configuration indication provided by an embodiment of the present application.

In order to make those skilled in the art understand the technical solutions of the present disclosure better, the technical solutions in the embodiments of the present application will be described below clearly and completely with reference to the drawings.

It should be noted that terms "first", "second", and the like in the specification and the claim of the present application and the above drawings are configured to distinguish similar objects, and are not necessarily configured to describe a specific sequence or a precedence sequence. It should be understood that data used in this way may be interchanged where appropriate, so that the embodiments of the present application described here may be implemented according to sequences other than those illustrated or described here. The implementations described in the following exemplary embodiments do not represent all implementations consistent with the present application. On the contrary, they are only examples of an apparatus and method consistent with some aspects of the present application as detailed in the appended claims.

Some terms appearing in the text are explained as follows.
1. A term "and/or" in the embodiments of the present application describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship.
2. A terminal, also called user equipment (UE), a mobile station (MS), a mobile terminal (MT) and the like, is a device for providing voice and/or data connectivity for a user, for example, a handheld device, a vehicle-mounted device and the like with a wireless connecting function. At present, some examples of the terminal are: a mobile phone, a tablet computer, a notebook computer, a palm computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home and the like.
3. A network side device may be a radio access network (RAN) node or a base station. An RAN is a part in a network for accessing the terminal into a wireless network. The RAN node (or device) is a node (or device) in a radio access network, and may also be called the base station. At present, some examples of the RAN node are: a 5G base station (generation node B, gNB), a transmission reception point (TRP), an evolved Node B (eNB), a radio network controller (RNC), a node B (NB), a base station controller (BSC), a base transceiver station (BTS), a femto (such as a home evolved NodeB or a home Node B (HNB)), a base band unit (BBU), or a wireless fidelity (Wifi) access point (AP), and the like. In addition, in a network structure, the RAN may include a centralized unit (CU) node and a distributed unit (DU) node.

A network architecture and a service scenario described by the embodiments of the present application are for the purpose of illustrating the technical solutions of the embodiments of the present application more clearly, and do not constitute limitation to the technical solutions provided by the embodiments of the present application. Those skilled in the art may know that with evolution of the network architecture and occurrence of a new service scenario, the technical solutions provided by the embodiments of the present application are also applicable for the similar technical problem.

In order to make objectives, technical solutions and advantages of the present application clearer, the present application will be further described in detail below with reference to accompanying drawings. Obviously, the described embodiments are only part of the embodiments of the present application, but not all the embodiments. On the basis of the embodiments in the present application, all other embodiments obtained by those skilled in the art without inventive efforts fall within the protection scope of the present application.

In an NR system, a plurality of serving cells or the same serving cell may simultaneously send a plurality of downlink control information for a terminal on one symbol. Due to a limited receiving capability of the terminal, if only one receiving antenna array is equipped, only one spatial filter can be used on the same symbol for receiving. In this regard, a protocol specifies a behavior of the terminal to monitor a physical downlink control channel (PDCCH): within the same monitoring occasion, the terminal only monitors the PDCCH in one control resource set (CORESET) meeting a specific condition and a CORESET having the same QCL-Type D property as this CORESET.

Here, one CORESET meeting the specific condition means that: if a serving cell contains a common search space (CSS) set, the CORESET is a CORESET corresponding to a CSS set with a lowest CSS set index among cells with a lowest cell index in cells containing the CSS set. Otherwise, the CORESET is a CORESET corresponding to a UE-specific search space (USS) set with a lowest USS set index among the cells with the lowest cell index.

In this way, a network side device only sends the PDCCH in a CORESET that can be monitored by the terminal, and will not send the PDCCH in the CORESET that cannot be monitored by the terminal (for example, a CORESET with the QCL-Type D property different from that of the CORESET meeting the specific condition).

When the network side device has a plurality of transmission points, the plurality of transmission points may independently send their own PDCCHs in different CORESET groups (all the CORESETs are divided into two groups according to configuration of a higher-layer parameter CORESETPoolIndex, and each group corresponds to one transmission point) to schedule their own PDSCHs. Generally, the CORESETs configured by the plurality of transmission points or the PDCCHs sent by the plurality of transmission points have different QCL-Type D properties.

The terminal having the plurality of receiving antenna arrays is capable of receiving two or more PDCCHs with the different QCL-Type D properties at the same time. If the terminal is still restricted to monitor only a CORESET with one QCL-Type D property on one symbol, on the one hand, scheduling flexibility of the plurality of transmission points of the network side device may be limited; for example, the plurality of transmission points need to send the PDCCH for the same terminal on the different symbols. On the other hand, the terminal with the plurality of antenna arrays can only receive a PDCCH with one QCL-Type D property signal on one symbol, which will result in the failure to take advantage of the plurality of antenna arrays of the terminal, waste resources and reduce system performance.

Based on the above problem, as shown in FIG. 1, an embodiment of the present application provides a method for monitoring a control channel, including the following.

S101, a terminal determines, according to first information configured by a network side device, at least two CORESETs or search space sets (SS sets) having at least two QCL-Type D properties, or the terminal determines, according to a control channel transmission pattern configured by the network side device, at least two CORESETs or search space sets having an association relationship.

S102, the terminal monitors the at least two control channels according to the at least two determined CORESETs or search space sets.

According to the embodiments of the present application, the terminal determines, according to the first information configured by the network side device, the at least two CORESETs or search space sets having the at least two QCL-Type D properties, or the terminal determines, according to the control channel transmission pattern configured by the network side device, the at least two CORESETs or search space sets having the association relationship; and the terminal monitors the at least two control channels according to the at least two determined CORESETs or search space sets. The terminal determines the at least two CORESETs or search space sets having the at least two QCL-Type D properties, or determines CORESETs or search space sets having the association relationship, and therefore the CORESETs or search space sets monitored by the terminal can correspond to different transmission points, so that the terminal can receive control channels sent by the plurality of transmission points on the same symbol, thereby reducing resource waste and further improving system performance.

In addition, according to the method for monitoring the control channel of the application, the network side device and the terminal have the same understanding on the CORESETs, so that the network side device may send the control channels only in the CORESETs, thereby saving transmission resources. Accordingly, the terminal may monitor the control channels only in the determined CORESETs, thereby avoiding monitoring in a CORESET where the network side device does not transmit the control channels, and ensuring that the control channels are monitored within the specified number of times of blind detection.

Because the terminal can receive control signals sent by the plurality of transmission points on the same symbol, scheduling flexibility of the plurality of transmission points of the network side device can be improved. At the same time, when the terminal has a plurality of antenna arrays, the plurality of antenna arrays of the terminal are effectively utilized.

The terminal in the embodiments of the present application may be configured with one receiving antenna array or the plurality of receiving antenna arrays. If the terminal is configured with the plurality of receiving antenna arrays, the terminal may monitor the CORESETs or search space sets having the two or more QCL-Type D properties.

In the embodiments of the present application, the terminal first determines the at least two CORESETs or search space sets, and then monitors the at least two control channels according to the at least two determined CORESETs or search space sets.

There are two modes for the terminal to determine the at least two CORESETs or search space sets. Mode 1, the terminal determines, according to the first information configured by the network side device, the at least two control resource sets (CORESETs) or search space sets having the at least two QCL-Type D properties. Mode 2, the terminal determines, according to the control channel transmission pattern configured by the network side device, the at least two CORESETs having the association relationship.

The first information in Mode 1 is configured to indicate the terminal to monitor the CORESETs or search space sets having the at least two QCL-Type D properties.

During implementation, the terminal determines, according to the first information configured by the network side device, the at least two CORESETs having the at least two QCL-Type D properties. The terminal determines, according to the first information configured by the network side device, the at least two CORESETs having the at least two QCL-Type D properties in different CORESET groups, or also determines the at least two CORESETs having the at least two QCL-Type D properties in the same CORESET group.

It should be noted that the CORESET group here includes multiple CORESETs with the same higher-layer parameter configuration.

During implementation, the terminal determines, according to the first information configured by the network side device, the at least two search space sets having the at least two QCL-Type D properties, and the search space sets here may be the same or different.

The first information in the embodiments of the present application includes a radio resource control (RRC) signaling and/or a media access control control element (MAC CE) signaling, and the RRC signaling and/or the MAC CE signaling is configured to indicate a CORESET or search space set that can be monitored.

Specifically, it may be configured through the following three manners.

Manner 1: a new RRC parameter is introduced besides CORESET configuration or search space set configuration (such as PDCCH-Config) to indicate one or more CORESET indexes or indexes of the one or more search space sets that may be monitored by each bandwidth part (BWP) or each carrier component (CC) or the plurality of CCs. For example, when indicating in a unit of CC, the CORESET index may be an absolute index (for example, from 0 to 11 or from 0 to 15). For example, when indicating in a unit of BWP, the CORESET index may be a relative index, namely, CORESETs with lowest and next lower indexes of the current BWP. The similar method is also used to indicate the index of the search space set. For another example, when there are the plurality of CCs, updating is performed in a unit of CC list of higher-layer parameter configuration (for example, an existing higher-layer parameter simultaneousTCI-UpdateList1 or simultaneousTCI-UpdateList2 may be reused, as shown in the following configuration).

the control channels in the CORESET, where the CORESET has at least one TCI state; and may further be: repeatedly transmitting the control channels in the CORESET within one slot or in multiple slots, where offset between the CORESET and the search space is a fixed value.

It should be noted that repeatedly transmitting the control channels means to transmit the two control channels, for example, one control channel is transmitted in each search space.

The association relationship in the embodiments of the present application may be an association relationship of CORESET indexes or search space indexes or TCI states among CORESETs of multiple slots; and may also be an association relationship of CORESET indexes or search space indexes or TCI states among multiple CORESETs of the same slot.

```
simultaneousTCI-UpdateList1-r16
 (1..maxNrofServingCellsTCI-r16)) OF ServCellIndex    SEQUENCE (SIZE
                                                      OPTIONAL,         -- Need R
simultaneousTCI-UpdateList2-r16
 (1..maxNrofServingCellsTCI-r16)) OF ServCellIndex    SEQUENCE (SIZE
                                                      OPTIONAL,         -- Need R
simultaneousSpatial-UpdatedList1-r16
 (1..maxNrofServingCellsTCI-r16)) OF ServCellIndex    SEQUENCE (SIZE
                                                      OPTIONAL,         -- Need R
simultaneousSpatial-UpdatedList2-r16
 (1..maxNrofServingCellsTCI-r16)) OF ServCellIndex    SEQUENCE (SIZE
                                                      OPTIONAL,         -- Need R
```

A transmission point (TRP) list may further be newly configured, and TRPs (represented by a CORESET or search space set index or resource) in the same list have the same transmission configuration indication (TCI) state. It may also be a CORESET list or a search space set list; and when it is indicated that one of the CORESETs or search space sets can be monitored, other CORESETs or search space sets in the list can also be monitored. This method is also applicable to Manner 2.

Manner 2: under an existing CORESET configuration (higher-layer parameter ControlResourceSet) or search space set configuration (higher-layer parameter SearchSpace), the new RRC parameter is introduced to indicate whether the current CORESET or search space set is monitored. For example, when the higher-layer parameter is 0, it means that the CORESET or search space set cannot be monitored, and when the higher-layer parameter is 1, it means that the CORESET or search space set can be monitored; or when the higher-layer parameter is 1, it means that the CORESET or search space set cannot be monitored, and when the higher-layer parameter is 0, it means that the CORESET or search space set can be monitored.

Manner 3: on the basis of Manner 1 and Manner 2, an MAC CE signaling may further be used to update the monitored CORESETs or search space sets. For details, reference may be made to the implementation of Manner 1 and Manner 2, which will not be repeated here.

If the above RRC parameter is not configured, the terminal may use a predefined mode to determine the CORESETs or search space sets that can be monitored. The predefined mode is a mode for determining the CORESETs or search space sets in the following embodiments.

In the embodiments of the present application, the terminal determines, according to the control channel transmission pattern configured by the network side device, the at least two CORESETs and search space sets having the association relationship. The control channel transmission pattern here may be: repeatedly transmitting the control channels in multiple slots, where each slot has the same search space or CORESET; may be: repeatedly transmitting During specific implementation, the terminal receives and monitors the CORESETs at the same monitoring occasion according to the association relationship of the determined CORESET or search space; or after the terminal monitors the CORESET of one monitoring occasion, the terminal determines other CORESETs according to the association relationship of the determined CORESET or search space and performs receiving and monitoring.

After monitoring the control channel in one CORESET, the terminal may continue monitoring in the associated CORESET according to the association relationship, so as to narrow a monitoring range and save resources.

During implementation, the at least two CORESETs determined by the terminal may include one CORESET in a first CORESET group of a first cell and one CORESET in a second CORESET group of the first cell; may be a CORESET corresponding to a search space set of a second cell and one CORESET of the first cell, where the search space set here is a search space set with a lowest search space set index in the second cell; may further be at least two CORESETs with different QCL-Type D properties corresponding to multiple search space sets with a lowest index; may further be the CORESET corresponding to one search space set of the second cell and one CORESET of a third cell, where one CORESET of the third cell corresponds to a search space set associated with the search space set of the second cell or corresponds to a search space set with a lower cell index and/or search space set index value; and may further be a CORESET corresponding to one search space set of a fourth cell and a CORESET corresponding to one search space set of a fifth cell, where one search space set of the fourth cell is a search space set with a lowest cell index and/or search space set index value among the search space sets having an association relationship, and one search space set of the fifth cell is a search space set associated with the search space set of the fourth cell or the search space set with the lower cell index and/or search space set index value.

One CORESET in the above first CORESET group may be a CORESET corresponding to a USS set or CSS set with a lowest index among search space sets associated with the first CORESET group of the first cell; and one CORESET in the above second CORESET group may be a CORESET corresponding to a USS set or CSS set with a lowest index among search space sets associated with the second CORESET group of the first cell.

The above third cell may also be the second cell, and the search space set of the second cell may be the search space set with the lowest index among the USS or CSS sets of the second cell, or the search space set with the lowest index among the search space sets having the association relationship. For example, one search space set (SS set a) is first determined according to an index value and/or type (the CSS set or the USS set) of the search space sets in the second cell or the fourth cell. If there are other search space sets (such as SS set b) associated with it, for example, the two search space sets are used together for PDCCH repetition transmission, then it is determined that the search space set (SS set b) associated with it or the CORESET (such as CORESET B) associated with search space set (SS set b) is also used for monitoring. If there is no other search space set associated with it, it is determined whether there are other SS sets in the CORESET (such as CORESET A) where SS set a is associated have the association relationship. If yes, such as SS set i and SS set j, another CORESET or SS set is determined according to other SS sets (such as an SS set with the lower index value among other SS sets). If there is no SS set having the association relationship, another CORESET or search space set is still determined according to the cell or CORESET or search space index value.

For another example, one search space set is first determined according to the association relationship and/or type (the CSS set or the USS set), for example, one search space set with the lowest cell index or CORESET or search space set index is first selected from the CSS set or USS set having the association relationship, and then it is determined that the search space set associated with it or the CORESET associated with search space set may also be used for monitoring. For another example, if two associated search space sets are in the same CORESET, another CORESET or search space set that can be monitored may further be determined according to the index value of the cell or search space set or the CORESET, that is, the two CORESETs or search space sets with different QCL-Type D parameters are determined for monitoring. The CORESET or search space set may further be determined by using a method of a combination of the above several methods.

The above lower is the lower except the lowest, such as next lower.

When the network device configures the SS set having the association relationship for the terminal and meanwhile configures the higher-layer parameter CORESETPoolIndex for the CORESET, a predefined rule needs to be defined to determine which CORESETs or search space sets may be monitored. For example, the CORESETs or search space sets are determined first according to the configuration of the CORESETPoolIndex parameter, or the CORESETs or search space sets are determined first according to the association relationship. Similarly, if the network side device configures the terminal for single frequency network (SFN) transmission, one CORESET may have two different QCL-Type D parameters, and the association relationship of an SS set is configured at the same time, it is also necessary to define a determination sequence, for example, the CORESETs or search space sets having the two QCL-Type D parameters are selected first for monitoring. It is also similar when configuring SFN, the association relationship and CORESETPoolIndex at the same time, and a sequence needs to be defined in advance to prevent the network side device and the terminal from having different understandings, thus causing them to determine different CORESETs for transmission/monitoring, and causing transmission failure.

During implementation, the first cell may include a cell with a lowest index among cells including two different CORESETPoolIndex values; may include a cell with a highest index among the cells including the two different CORESETPoolIndex values; may include all the cells among the cells including the two different CORESETPoolIndex values; and may further be one cell preconfigured by the network side device.

During implementation, the second cell may include a cell with a lowest index among cells including a CSS set; may include a cell with a lowest CSS set index or USS set index among all cells; and may further include a cell with a lowest index among cells including a USS set.

The above illustrates that the terminal determines the CORESETs or search space sets having the at least two QCL-Type D properties. In addition, the terminal may further determine the CORESET or search space set having one QCL-Type D property.

Specifically, the terminal determines the CORESET or search space set with one QCL-Type D property in a case that the network side device does not configure the first information for the terminal; and the terminal determines the CORESET or search space set with one QCL-Type D property in a case that the network side device configures second information for the terminal, and the second information here is configured to indicate the terminal to monitor the CORESET or search space set with one QCL-Type D property.

When the network side device configures the second information for the terminal and the terminal determines the CORESET or search space set with one QCL-Type D property, the terminal determines the CORESET or search space set with one QCL-Type D property according to at least one of: a cell index; CORESET group information; or a search space index.

It should be noted that the CORESETs or search space sets determined in the embodiments of the application are all the CORESETs or search space sets, that is, the CORESETs or search space sets are all determined in the CORESETs or search space sets. Therefore, the lowest or next lower or lower CORESET index, cell index, or search space set index in the embodiments all refer to that the CORESETs, cells, or search space sets have the lowest or next lower or lower CORESET, cell, or search space set.

In a new radio (NR) system, when the plurality of physical channels or physical signals are subjected to multiplexing transmission on the same symbol, a protocol may specify a transmission priority or TCI state of each physical channel or physical signal, so that the terminal receives only one physical channel or physical signal on one symbol, or receives physical channels or physical signals having the same TCI state. For example, when a PDCCH and a PDSCH are transmitted on the same symbol and have different TCI states, the terminal may receive the PDCCH preferentially. For another example, when the PDCCH and a channel state information reference signal (CSI-RS) are transmitted on one symbol, the terminal may expect that the CSI-RS and a demodulation reference signal (DMRS) of the PDCCH to be quasi co-located with regard to a 'quasi co-location Type D' ('QCL-Type D') parameter.

After the introduction of transmission through the plurality of transmission points, the receiving capability of the terminal is also enhanced. For a terminal with two or more receiving arrays, the plurality of transmission points may also send the plurality of physical channels or physical signals with the different QCL-Type D properties on the same symbol to improve system performance, such as the plurality of PDCCHs, two PDSCHs, or two CSI-RSs. However, when the different physical channels or physical signals are multiplexed in a time domain, transmission of the physical channels or physical signals having the more than two QCL-Type D properties may occur on one symbol, for example, the plurality of PDCCHs and the two PDSCHs are transmitted on the same symbol. This will cause the terminal to fail to receive all the physical channels or physical signals sent by the network side device, resulting in performance loss, and unnecessary power and resource consumption of the network side device at the same time.

Based on the above problem, as shown in FIG. 2, an embodiment of the present application provides a method for determining a transmission configuration indication, including the following.

S201, a terminal determines configuration information configured by a network side device for determining a TCI state.

S202, the terminal determines one or two TCI states for transmitting all physical channels and/or physical signals within one time unit according to the configuration information, where a TCI state of each of the physical channels or physical signals is at least one of the one or two TCI states.

In the embodiments of the present application, the terminal first determines the configuration information configured by the network side device for determining the TCI state, and then determines the one or two TCI states used for transmitting all the physical channels and/or physical signals within one time unit according to the configuration information, where the TCI state of each physical channel or physical signal is at least one of the one or two TCI states. Since the terminal has determined the one or two TCI states, it may not exceed a receiving capability of the terminal to avoid the terminal being unable to effectively receive the physical channels and/or the physical signals, further reducing resource waste and improving system performance.

In an optional implementation, if the physical signals include a CSI-RS, and the determining, by the terminal, the one or two TCI states for transmitting all the physical channels and/or physical signals within one time unit according to the configuration information, includes part or all of:

a TCI state associated with the CSI-RS; or
a TCI state associated with a CORESET group, where the CORESET group is a CORESET group associated with the CSI-RS, or a CORESET group for triggering control signaling transmission of an aperiodic CSI-RS.

In an optional implementation, if the physical signals include the CSI-RS, the terminal determines an association relationship between the CSI-RS and the CORESET according to the configuration information; and the terminal determines the one or two TCI states for transmitting the CSI-RS within one time unit according to the association relationship.

In another optional implementation, if the physical channels include a PDCCH or PDSCH, the one or two TCI states include a TCI state associated with a CORESET group, and the CORESET group is a CORESET group associated with the PDCCH or PDSCH.

In another optional implementation, the physical channels and/or the physical signals include a CSI-RS and at least one PDCCH, and then the one or two TCI states determined by the terminal include a combination of TCI states of the at least one PDCCH; and/or the TCI state of one PDCCH in the at least one PDCCH.

During implementation, the TCI state of one PDCCH in the at least one PDCCH may be a TCI state of a PDCCH sent in a CORESET group associated with the CSI-RS.

In the embodiments of the present application, the determining, by the terminal, the one or two TCI states may include determining, by the terminal, the one or two TCI states configured according to an RRC signaling, may include determining, by the terminal, the one or two TCI states indicated according to a DCI signaling, and may include determining, by the terminal, the one or two TCI states according to a predefined rule.

The one or two TCI states determined by the terminal according to the predefined rule here may be a TCI state of at least two CORESETs monitored by the terminal, and may also be a TCI state of a CORESET with a lowest index among CORESETs with a search space in two CORESET groups monitored by the terminal.

During implementation, all time units in one scheduling unit have one same state or two same TCI states, or each of time units in one scheduling unit has its own one or two TCI states.

The time units in the embodiments of the present application may be a PDCCH monitoring symbol; may be a symbol with PDSCH scheduling offset being less than a first threshold; may be a symbol with the PDSCH scheduling offset being greater than or equal to a second threshold; and may further be symbols other than the PDCCH monitoring symbol in one scheduling unit.

It should be noted here that the first threshold and the second threshold may be the same or different.

For the convenience of understanding, the present application is illustrated in the following specific embodiments.

Embodiment 1

If a terminal is configured with a plurality of receiving antenna arrays, the terminal may monitor CORESETs having two or more QCL-Type D properties. The CORESETs having the two or more QCL-Type D properties here may be two CORESETs in a cell including two different CORESETPoolIndex values.

For example, the two CORESETs may respectively come from a first CORESET group and a second CORESET group of a first cell in the cells including the two different CORESETPoolIndex values.

In the embodiments of the present application, the first CORESET group may be configured to represent a set composed of a CORESET with a higher-layer parameter CORESETPoolIndex configured as 0 or without the higher-layer parameter CORESETPoolIndex configured, and the second CORESET group may be configured to represent a set composed of a CORESET with the higher-layer parameter CORESETPoolIndex configured as 1.

Specifically, the first cell may be a cell with a lowest index among cells including the two different CORESETPoolIndex values, may be a cell with a highest index among the cells including the two different CORESETPoolIndex values, and may further be one cell preconfigured by a network side.

The two CORESETs in the cell including the two different CORESETPoolIndex values may be a CORESET, of the first cell, corresponding to a USS set or CSS set with a lowest index among search space sets associated with or corresponding to the first CORESET group, and a CORESET, of the first cell, corresponding to a USS set or CSS set with a lowest index among search space sets associated with or corresponding to the second CORESET group.

In configuration of the search space sets, each search space set may be configured with one CORESET associated with or corresponding to the search space set, indicating that the search space set is in the CORESET associated with or corresponding to the search space set.

Accordingly, one CORESET may be associated with multiple search space sets. For example, as shown in the following table, a search space set 4 is associated with a CORESET2, and the CORESET2 is associated with the search space set 4 and a search space set 5.

|  | Associated CORESET | CORESETPoolIndex value |
|---|---|---|
| Search space 1 | CORESET 1 | 0 |
| Search space 2 | CORESET 3 | 0 |
| Search space 3 | CORESET 1 | 0 |
| Search space 4 | CORESET 2 | 1 |
| Search space 5 | CORESET 2 | 1 |
| Search space 6 | CORESET 4 | 1 |

The search space set associated with the first CORESET group is composed of search spaces associated with the CORESETs in the first CORESET group. Taking the above table as an example, the search spaces associated with all the CORESETs in the first CORESET group are the search space 1, the search space 2, and the search space 3, and thus the search space set associated with the first CORESET group is {search space 1, search space 2, and search space 3}. The search spaces associated with the second CORESET group are the search space 4, the search space 5, and the search space 6, and thus the search space set associated with the second CORESET group is {search space 4, search space 5, and search space 6}.

The two monitored CORESETs are respectively associated with two transmission points in one cell, which can ensure that the two selected CORESETs have the different QCL-Type D properties, so that the characteristic of multiple receiving arrays of the terminal can be utilized maximally. In addition, in a carrier aggregation (CA) scenario, especially in an intra-band CA, spatial transmission properties of a plurality of carrier components (CCs) are very similar; and the QCL-Type D properties of one cell can also represent the QCL-Type D properties of other cells to a certain extent.

In addition, according to the method for monitoring the control channel of the application, the network side device and the terminal have the same understanding on the CORESETs, so that the network side device may send the control channels only in the CORESETs, thereby saving transmission resources. Accordingly, the terminal may monitor the control channels only in the determined CORESETs, thereby avoiding monitoring in a CORESET where the network side device does not transmit the control channels, and ensuring that the control channels are monitored within the specified number of times of blind detection.

Embodiment 2

If a terminal is configured with a plurality of receiving antenna arrays, the terminal may monitor CORESETs having two or more QCL-Type D properties. The CORESETs having the two or more QCL-Type D properties here may be: one CORESET of a cell with a lowest index (a second cell below) and one CORESET of a first cell.

The second cell may be the cell with the lowest index among cells including a CSS set, may also be a cell with a lowest index among all cells, and may further be a cell with a lowest index among cells including a USS set. The second cell may be a primary cell (PCell) in a CA scenario.

One CORESET of the second cell may be a CORESET corresponding to a USS set with a lowest USS set index in the second cell, and may also be a CORESET corresponding to a CSS set with a lowest CSS set index in the second cell.

One CORESET of the first cell may be one CORESET in a first CORESET group of the first cell, and may further be one CORESET in a second CORESET group. The first cell may be a cell with a lowest index among cells including two different CORESETPoolIndex values, may be a cell with a highest index among the cells including the two different CORESETPoolIndex values, may be all the cells including the two different CORESETPoolIndex values, and may further be one cell preconfigured by the network side device.

The difference between the first cell and the second cell here is that: the first cell represents one of the cells with a plurality of transmission points, and the second cell is a cell with a lowest search space set index, corresponding to a PCell and a primary secondary cell group cell (PSCell) in CA and dual connectivity (DC) scenarios.

For example, when all the CORESETs in the second cell are not configured with a higher-layer parameter CORESETPoolIndex, or a value of the higher-layer parameter CORESETPoolIndex is 0, the CORESET of the first cell may be a CORESET, of the first cell, corresponding to the USS set or CSS set with the lowest index in the search space set associated with or corresponding to the second CORESET group. In this way, it may be ensured that the two selected CORESETs are respectively associated with different transmission points, and can be ensured that the two selected CORESETs have the different QCL-Type D properties, and therefore, the characteristic of multiple receiving arrays of the terminal can be utilized maximally.

For another example, when the values of the higher-layer parameter CORESETPoolIndex of all the CORESETs in the second cell are 1, the CORESET of the first cell may be a CORESET, of the first cell, corresponding to the USS set or CSS set with the lowest index in the search space set associated with the first CORESET group. In this way, it may be ensured that the two selected CORESETs are respectively associated with different transmission points, and can be ensured that the two selected CORESETs have the different QCL-Type D properties, and therefore, the characteristic of multiple receiving arrays of the terminal can be utilized maximally.

For another example, when the values of the higher-layer parameter CORESETPoolIndex of the CORESET in the second cell are both 0 and 1, the second cell and the first cell are the same cell. At this time, one CORESET of the first cell may be a CORESET in a CORESET group different from that of one CORESET of the second cell. For example, the terminal monitors CORESETs, of the second cell (that is, the first cell), corresponding to the USS set or CSS set with the lowest index among search space sets associated with or corresponding to the first CORESET group, and monitors the CORESET, of the first cell (that is, the second cell), corresponding to the USS set or CSS set with the lowest index among the search space sets associated with or corresponding to the second CORESET group. In this way, it may be ensured that the two selected CORESETs are respectively associated with the different transmission points, and can be ensured that the two selected CORESETs have the different QCL-Type D properties, and therefore, the characteristic of the multiple receiving arrays of the terminal can be utilized maximally.

Embodiment 3

If a terminal is configured with a plurality of receiving antenna arrays, the terminal may monitor CORESETs having two or more QCL-Type D properties. The CORESETs with the two or more QCL-Type D properties may be: at least two CORESETs having different QCL-Type D properties corresponding to N search space sets (such as N USS sets, or N CSS sets, or N1 USS sets and N2 CSS sets, where N1+N2=N) with a lowest index.

A numerical value of N depends on the QCL-Type D properties of the search space sets. For example, if the search space set with the lowest index and a search space set with the next lower index correspond to the same CORESET, or have the same QCL-Type D property, it is also necessary to consider another search space set with a lower index until the two CORESETs with the different QCL-Type D properties are determined, so the value of N may be greater than 2.

In addition, the N search space sets with the lowest index may be the N search space sets with the lowest index in all the cells, and may further be the N search space sets with the lowest index in one cell (for example, the first cell, the second cell, and so on).

In this way, even if control channel higher-layer configuration PDCCH-Config of all the cells only includes one value of the CORESETPoolIndex, that is, it is associated with one transmission point, it may also be ensured that the two selected CORESETs have the different QCL-Type D properties. Compared with a situation of only receiving a CORESET having one QCL-Type D property, a characteristic of the multiple receiving arrays of the terminal can be utilized maximally.

Embodiment 4

If a terminal is configured with one receiving antenna array, the terminal may only monitor CORESETs having one QCL-Type D property. When determining CORESETs, the impact of multiple transmission points (such as the impact of a higher-layer parameter CORESETPoolIndex) may be considered.

For example, the terminal may monitor one CORESET in a cell with a lowest index (such as a second cell) among cells including a CSS set or USS set. The CORESET may be one CORESET in a first CORESET group (a set composed of CORESETs without higher-layer parameter CORESETPoolIndex configured, or with higher-layer parameter CORESETPoolIndex configured as 0) in the second cell. Specifically, the terminal monitors a CORESET, of the second cell, corresponding to the USS set or CSS set with the lowest index among the search space sets associated with or corresponding to the first CORESET group. Similarly, the terminal may also preferentially monitor the CORESET, of the second cell, corresponding to the USS set or CSS set with the lowest index among search space sets associated with or corresponding to a second CORESET group.

For another example, the terminal may monitor one CORESET of one cell among cells including two different CORESETPoolIndex values, for example, one CORESET of the first cell. Specifically, the terminal monitors a CORESET, of the first cell, corresponding to the USS set or CSS set with the lowest index among the search space sets associated with or corresponding to the first CORESET group. Similarly, the terminal may also preferentially monitor the CORESET, of the first cell, corresponding to the USS set or CSS set with the lowest index among search space sets associated with or corresponding to a second CORESET group.

When the cell includes the plurality of transmission points, a control channel sent by one transmission point may be received preferentially. In this way, a network side device may send important control information via one transmission point. In addition, in a CA scenario, especially in an intra-band CA, spatial transmission properties of a plurality of CCs are very similar. The QCL-Type D properties of one cell can also represent the QCL-Type D properties of other cells to a certain extent.

Embodiment 5

If a terminal is configured with more than two receiving antenna arrays, the terminal may monitor CORESETs having more than two QCL-Type D properties.

When determining CORESETs, the CORESETs having the two QCL-Type D properties may be determined first according to methods of embodiment 1 and embodiment 2, and then CORESETs having other QCL-Type D properties are determined.

For example, in an unmonitored search space set, a search space set with a lowest index is selected, and whether a CORESET associated with or corresponding to the search space set has different QCL-Type D properties from the two selected CORESETs is determined. If they have the different QCL-Type D properties, the CORESET serves as a CORESET with a third QCL-Type D property, and the CORESET and its associated or corresponding search space set are monitored. Otherwise, the CORESET and its associated or corresponding search space set will still be monitored, and the search space set with the lowest index will continue to be sought out in the unmonitored search space set, to determine whether its associated or corresponding search space set has the different QCL-Type D properties, until three or more CORESETs with the different QCL-Type D properties are determined.

For another example, the CORESET with the third QCL-Type D property may further be one CORESET in a first CORESET group or a second CORESET group in one cell. A specific determination method may be as follows: in the search space sets associated with or corresponding to the first CORESET group or the second CORESET group of one cell, sorting is performed according to indexes of the search space sets until the CORESET with the third QCL-Type D property is determined.

A method similar to the method of embodiment 3 may further be adopted. For example, the terminal monitors at least three CORESETs having the different QCL-Type D properties corresponding to M search space sets (such as M USS sets, or M CSS sets, or M1 USS sets and M2 CSS sets, where M1+M2=M) with a lowest index of one cell. A numerical value of M depends on the QCL-Type D properties of the search space sets. For example, if the search space set with the lowest index and a search space set with the next lower index correspond to the same CORESET, or have the same QCL-Type D property, it is also necessary to consider another search space set with a lower index until the at least three CORESETs with the different QCL-Type D properties are determined, so the value of M may be greater than 3.

Embodiment 6

The terminal is configured with a plurality of receiving antenna arrays, which may mean that the terminal reports a certain relevant capability to a network side device or the network side device configures a certain higher-layer parameter to the terminal.

For example, the terminal may implicitly represent that the terminal has the plurality of receiving antenna arrays by reporting the following capabilities: a capability to receive overlapping PDSCHs in a time domain, or a capability of reporting based on a group.

For another example, after receiving capability report of the terminal, the network side device may indicate a control channel monitoring behavior of the terminal by configuring the certain higher-layer parameter according to a service or network deployment situation. That is, the network side device instructs the terminal to monitor CORESETs with two different QCL-Type D properties, or a CORESET with one QCL-Type D property. That is, the network side device indirectly instructs the terminal to use the plurality of receiving antenna arrays or a single receiving array for receiving. In this way, the terminal may be prevented from always using the plurality of receiving arrays for receiving, especially when the network side device only sends a control channel with one QCL-Type D property, which can reduce power consumption of the terminal or give play to the maximum capability of the terminal.

When the terminal reports the certain capability to the network side device, or the network side device is configured with the certain higher-layer parameter (first information), the terminal monitors the CORESETs with the two or more QCL-Type D properties, for example, according to the method of embodiments 1, 2, 3 and 5. When the higher-layer parameter is not configured, the terminal monitors the CORESET with one QCL-Type D property, for example, by using a rule in an existing protocol or the rule in embodiment 4.

For another example, when the network side device is configured with second information, the terminal may use the rule in embodiment 4 to monitor the CORESET with one QCL-Type D property; otherwise, the terminal uses the rule in the existing protocol to monitor the CORESET with one QCL-Type D property.

Embodiment 7

When a plurality of transmission points are adopted for transmission, the number of physical channels or physical signals may be greater than 1, and there are many cases where the physical channels or physical signals are multiplexed in a time domain. For example, a plurality of PDCCHs and two PDSCHs are multiplexed on one symbol, the plurality of PDCCHs and a plurality of CSI-RSs are multiplexed on one symbol, the two PDSCHs and the plurality of CSI-RSs are multiplexed on one symbol, the plurality of CSI-RSs with different time domain transmission properties are multiplexed on one symbol, and so on. In various cases, the number of TCI states on one time domain symbol, and the number of QCL-Type D parameters of a reference signal, namely, the number of beams, may be both greater than two. However, the number of receiving antenna arrays of the terminal is generally 2, which cannot correctly receive the all physical channels or physical signals at the same time.

One method is to limit a maximum number of TCI states of all the physical channels or physical signals on one time domain symbol, that is, the number of the TCI states is limited to be 2. That is, the two TCI states are defined as TCI states of all the physical channels or physical signals, so that the number of TCI states on one time domain symbol will not exceed a receiving capability of the terminal.

Specifically, the two TCI states may be configured or indicated by a network side device, and may also be predefined. The TCI states of each physical channel or physical signal is the two TCI states.

In one scheduling unit, the two TCI states on all slots or symbols may be the same or different.

When the two TCI states on all the slots or symbols are the same, only two TCI states need to be configured or predefined. A combination of the two TCI states is illustrated below.

The combination of the two TCI states may be the two predefined TCI states, such as TCI states of two CORESETs monitored by the terminal, TCI states of CORESETs that actually carry the PDCCH, and two default TCI states of the PDSCH when scheduling offset is less than a threshold (TCI states of a CORESET with a lowest index in CORESETs with a search space in two CORESET groups).

The combination of the two TCI states may be two common TCI states configured by an RRC signaling, which are applied to reception of all the physical channels or physical signals within a time range when they act.

The combination of the two TCI states may be a TCI state indicated by a DCI signaling. A DCI domain indicated by a PDSCH TCI state is reused to indicate the TCI state of all the physical channels or physical signals. The TCI state indicated in one DCI can act on the physical channel or physical signal of the next scheduling unit.

When the two TCI states on all the slots or symbols are different, the two TCI states on each time unit need to be defined within one scheduling unit. For example, the two TCI states are used in a control region for transmitting PDCCH (a time domain resource occupied by a CORESET determined by the search space set, for a PDSCH mapping type A, it may be the first 1-3 symbols of one slot, and for a PDSCH mapping type B, it may be a monitoring symbol configured by a higher-layer signaling monitoringSymbolsWithinSlot), and the other two TCI states are used for other symbols other than the control region of the PDCCH.

The two TCI states used in each time unit may be one of the above combination of the two TCI states. For example, the two TCI states used in the control region may be the two predefined TCI states, and the two TCI states used by symbols other than the control region may be the two TCI states configured by the RRC signaling, or the two TCI states indicated by the DCI signaling, or other two predefined TCI states.

Through the method of the present application, the number of the TCI states sent by the network side device on each time unit does not exceed the receiving capability of the terminal, so there is no need to define a complex priority receiving principle.

For another example, the time units may also be divided in other methods. For example, the time units are divided into the control region, a region with PDSCH scheduling offset less than a threshold, a region with PDSCH scheduling offset greater than or equal to a threshold, and so on. The present application does not limit the division of time units.

The network side device may notify the terminal to enable the TCI state determination method in the present embodiments through the higher-layer signaling. For example, when configuring the first information, the terminal adopts the method of the present application to determine the TCI state of each physical channel or physical signal, while a TCI state indication (determination) method of each physical channel or physical signal specified in an original protocol does not take effect. When the higher-layer parameter is not configured, the terminal determines the TCI state of each physical channel or physical signal according to the rule in the existing protocol.

Optionally, the higher-layer parameter is introduced to indicate the maximum number of TCI states that the terminal can receive on one symbol. When configuring the second information, the terminal assumes that the two TCI states are used for transmission of the physical channels or physical signals in one slot or several symbols. When the second information is not configured, the terminal assumes that one TCI state is used for transmission of the physical channels or physical signals in one slot or several symbols.

Embodiment 8

Two TCI states are defined as TCI states of all physical channels or physical signals. The TCI state of each physical channel or physical signal is one of the two defined TCI states.

Assuming that the two TCI states are TCI 1 and TCI 2 respectively, each TCI state is associated with one CORESET group, and in addition, each physical channel or physical signal may also be associated with one CORESET group, in this way, an association relationship between each physical channel or physical signal and the TCI state may be established, so as to determine the TCI state of each physical channel or physical signal.

In the present application, the CORESET group refers to a group implicitly divided according to a higher-layer parameter CORESETPoolIndex in CORESETs. For example, a first CORESET group is a set composed of CORESETs without higher-layer parameter CORESETPoolIndex configured and CORESETs with the higher-layer parameter CORESETPoolIndex configured as 0. A second CORESET group is a set composed of CORESETs with the higher-layer parameter CORESETPoolIndex configured as 1.

The association relationship between the two TCI states and the two CORESET groups is that: the first TCI state (TCI 1) is associated with the first CORESET group, and the second TCI state (TCI 2) is associated with the second CORESET group. The converse is also possible. The association relationship may be pre-specified in a protocol or configured by a network side device. In the following description, the case that the first TCI state (TCI 1) is associated with the first CORESET group, and the second TCI state (TCI 2) is associated with the second CORESET group is taken as an example for illustration.

The association relationship between physical channels or physical signals and the two CORESET groups is as follows.

For a PDCCH, a CORESET that carries the PDCCH belongs to the first CORESET group or the second CORESET group. Therefore, the association relationship between the PDCCH and the CORESET group may be directly determined, and then its TCI state is determined. That is, the TCI state of the PDCCH sent in the CORESET of the first CORESET group is TCI 1, and the TCI state of the PDCCH sent in the CORESET of the second CORESET group is TCI 2.

A PDSCH may be associated with the CORESET group of the PDCCH that schedules the PDSCH. That is, if the PDCCH that schedules the PDSCH is sent in the CORESET of the first CORESET group, the TCI state of the PDSCH is TCI 1; and if the PDCCH that schedules the PDSCH is sent in the CORESET of the second CORESET group, the TCI state of the PDSCH is TCI 2.

For the CSI-RSs, each CSI-RS may be associated with the two TCI states or the CORESET group.

For example, the CSI-RS is associated with the TCI state, which may be: configuring one TCI state association indication in each CSI-RS configuration (for example, a CSI-RS resource, a CSI resource set or CSI resource setting and so on). For example, it indicates the CSI-RS configuration is which TCI state of the two TCI states.

For another example, the CSI-RS is associated with the CORESET, which may be: the higher-layer parameter CORESETPoolIndex is configured under the CSI-RS configuration, when the higher-layer parameter is not configured or the value of the higher-layer parameter is configured as 0, it means that the CSI-RS configuration is associated with TCI 1, that is, the TCI state of the CSI-RS is TCI 1; and when the value of the higher-layer parameter CORESETPoolIndex is configured as 1, it means that the CSI-RS configuration is associated with TCI 2, that is, the TCI state of the CSI-RS is TCI 2.

In addition, instead of using the higher-layer parameter CORESETPoolIndex, a new higher-layer parameter may further be defined, which has a similar function.

There may be other association methods for an aperiodic CSI-RS. If control information triggering the aperiodic CSI-RS is sent in the CORESET of the first CORESET group, the aperiodic CSI-RS is associated with the first CORESET group, that is, the TCI state of the aperiodic CSI-RS is TCI 1. If the control information triggering the aperiodic CSI-RS is sent in the CORESET of the second CORESET group, the aperiodic CSI-RS is associated with the second CORESET group, that is, the TCI state of the aperiodic CSI-RS is TCI 2.

Embodiment 9

Figure 3:
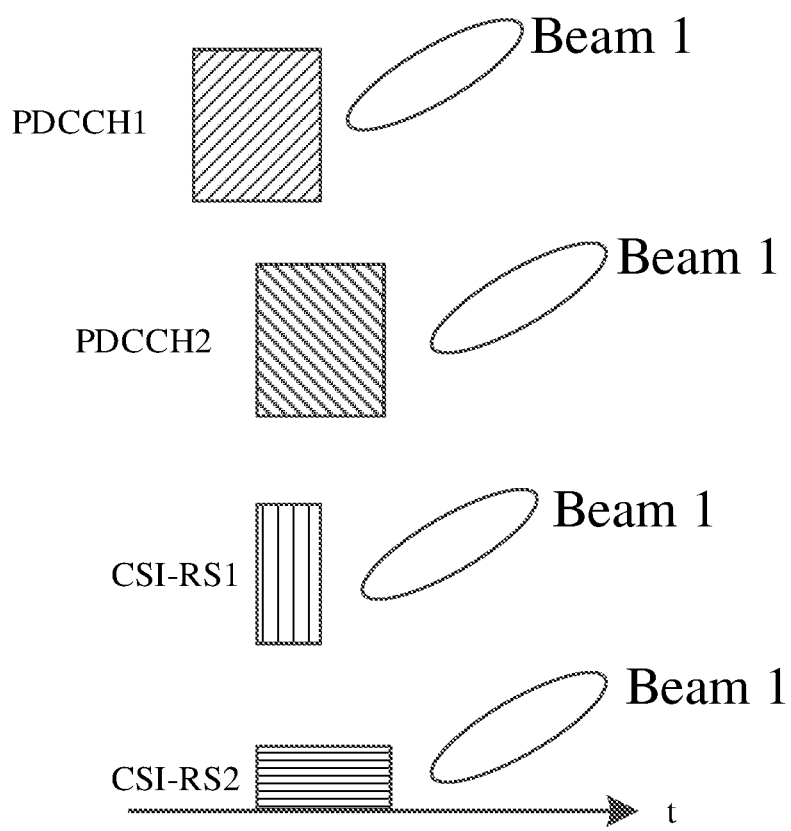
FIG. 3 is a first schematic diagram of a PDCCH and a CSI-RS overlapping on one symbol provided by an embodiment of the present application.

When a PDCCH and a CSI-RS overlap on one symbol, according to an existing protocol, a terminal may expect the CSI-RS and the DMRS of the PDCCH to be quasi co-located with regard to a 'QCL-Type D' parameter. After introduction of a multiple transmission point transmission technology, the terminal may receive the plurality of PDCCHs and the plurality of CSI-RSs on one symbol. If it is required that all the CSI-RSs and the DMRSs of all the PDCCHs are QCL with regard to the 'QCL-Type D' parameter (as shown in FIG. 3) at this time, there is some limitation.

Figure 4:
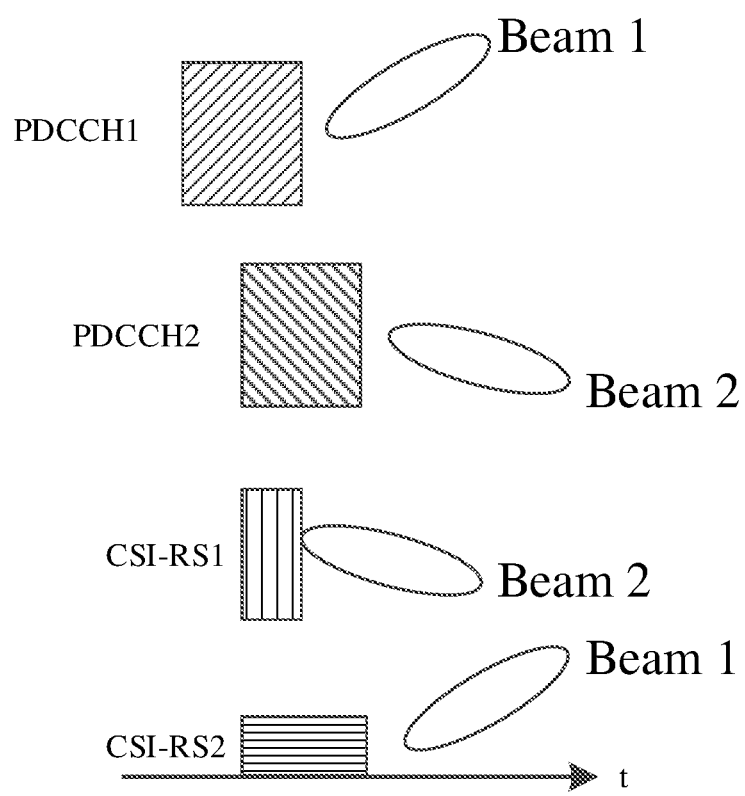
FIG. 4 is a second schematic diagram of a PDCCH and a CSI-RS overlapping on one symbol provided by an embodiment of the present application.

At this time, the terminal may determine or assume that each CSI-RS and the DMRS of one of the PDCCHs are QCL with regard to the 'QCL-Type D' parameter (as shown in FIG. 4). Specifically, if one CSI-RS is configured with the 'QCL-Type D' parameter, the terminal may expect that the CSI-RS and the DMRS of one PDCCH are QCL with regard to the 'QCL-Type D' parameter. If one CSI-RS is not configured with the 'QCL-Type D' parameter, the terminal may determine that the CSI-RS and the DMRS of one PDCCH are QCL with regard to the 'QCL-Type D' parameter. When there are the plurality of PDCCHs, one CSI-RS without 'QCL-Type D' parameter configured and the DMRS of which PDCCH being QCL with regard to the 'QCL Type D' parameter QCL may be configured by the higher-layer parameter.

For example, one higher-layer parameter is configured in the CSI-RS configuration (for example, the CSI-RS resource, the CSI resource set or CSI resource setting) to indicate the association relationship, for example, the higher-layer parameter CORESETPoolIndex is configured. When the higher-layer parameter is not configured or the value of the higher-layer parameter is configured as 0, it means that the CSI-RS configuration is associated with the PDCCH transmitted in the CORESET group without CORESETPoolIndex configured or with CORESETPoolIndex configured as 0, that is, it is QCL with regard to 'QCL-Type D' parameter. Similarly, when the value of the higher-layer parameter is configured as 1, it means that the CSI-RS configuration is associated with the PDCCH transmitted in the CORESET group with CORESETPoolIndex configured as 1, that is, it is QCL with regard to the 'QCL-Type D' parameter.

In particular, there may be other association methods for an aperiodic CSI-RS. If control information triggering an aperiodic CSI-RS is sent in CORESETs without the higher-layer parameter CORESETPoolIndex configured or with the higher-layer parameter CORESETPoolIndex configured as 0, the aperiodic CSI-RS is associated with the PDCCH transmitted in the CORESET group without CORESETPoolIndex configured or with CORESETPoolIndex configured as 0, that is, it is QCL with regard to 'QCL-Type D' parameter.

If the control information triggering the aperiodic CSI-RS is sent in the CORESETs with the higher-layer parameter CORESETPoolIndex configured as 1, the aperiodic CSI-RS is associated with the PDCCH transmitted in the CORESET group with the CORESETPoolIndex configured as 1, that is, it is QCL with regard to the 'QCL-Type D' parameter.

It should be noted that in high frequency band transmission, the control information triggering the aperiodic CSI-RS and the triggered CSI-RS are usually not sent on the same symbol.

Figure 5:
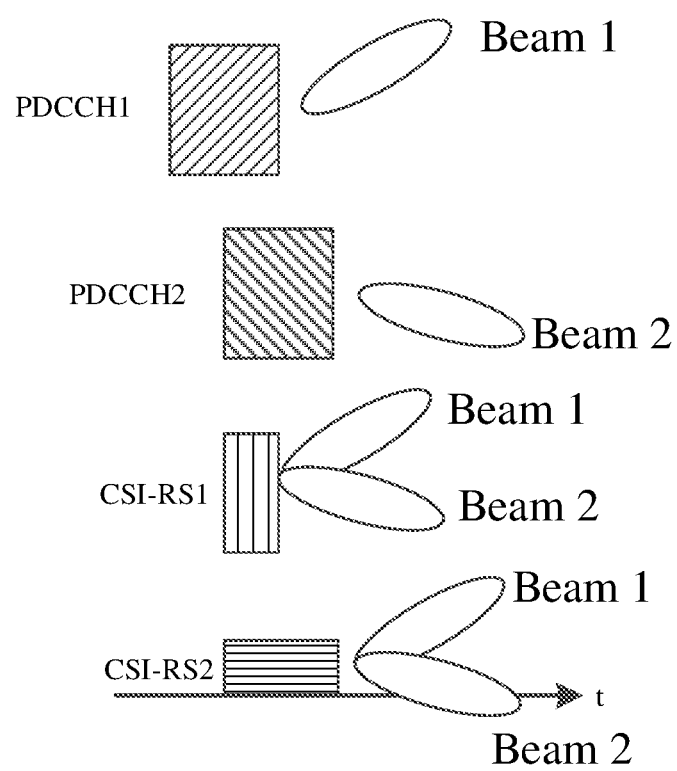
FIG. 5 is a third schematic diagram of a PDCCH and a CSI-RS overlapping on one symbol provided by an embodiment of the present application.

Or the terminal may assume that a QCL-Type D property of each CSI-RS is a combination of QCL-Type D properties of DMRSs of all the PDCCHs, but there is no need for the DMRSs of the plurality of PDCCHs to be QCL with regard to the 'QCL-Type D' parameter. As shown in FIG. 5, the DMRSs of PDCCH1 and PDCCH2 are not QCL with regard to the 'QCL-Type D' parameter. Specifically, when the CSI-RS is not configured with the TCI state, the terminal may assume that the QCL-Type D property of each CSI-RS is a combination of the QCL-Type D properties of the DMRSs of the PDCCH1 and the PDCCH2.

Beam 1 and beam 2 in FIG. 3, FIG. 4 and FIG. 5 are beams represented by the QCL-Type D parameters.

Based on the same inventive concept, embodiments of the present application further provide a terminal. Principles of the terminal for solving the problems are similar to that of the method for monitoring the control channel of the embodiments of the present application, therefore, implementation of the terminal may refer to that of the method, and repetitions are omitted.

Figure 6:
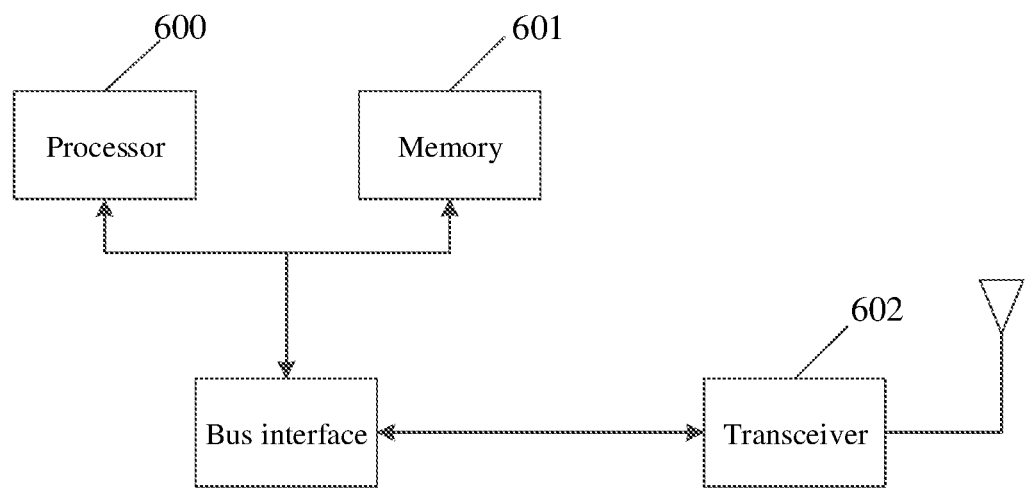
FIG. 6 is a schematic structural diagram of a terminal provided by an embodiment of the present application.

As shown in FIG. 6, an embodiment of the present application provides a terminal, including: a processor 600, a memory 601, a transceiver 602 and a bus interface.

The processor 600 is responsible for managing a bus architecture and usual processing, and the memory 601 may store data used by the processor 600 during operation execution. The transceiver 602 is configured to receive and send data under control of the processor 600.

The bus architecture may include any quantity of interconnected buses and bridges, which are specifically linked together by various circuits of one or more processors represented by the processor 600 and a memory represented by the memory 601. The bus architecture may further link various other circuits such as a peripheral device, a voltage stabilizer and a power management circuit together, which are publicly known in the art and therefore are not further described herein. The bus interface provides an interface. The processor 600 is responsible for managing the bus architecture and usual processing, and the memory 601 may store data used by the processor 600 during operation execution.

A flow disclosed in the embodiments of the present application may be applied to the processor 600 or be implemented by the processor 600. In an implementation process, all steps of a signal processing flow may be completed through an integrated logic circuit of hardware in the processor 600 or in a software form. The processor 600 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiments of the present application. The general-purpose processor may be a microprocessor or any conventional processor, etc. The steps of the method disclosed in combination with the embodiments of the present application may be directly embodied as being executed and completed by a hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 601, and the processor 600 reads information in the memory 601, and is combined with its hardware to complete the steps of the signal processing flow.

Specifically, the processor 600 is configured to read a program in the memory 601 and execute:
  determining, according to first information configured by a network side device, at least two CORESETs or search space sets having at least two QCL-Type D properties, or determining, according to a control channel transmission pattern configured by the network side device, at least two CORESETs or search space sets having an association relationship; and
  monitoring the at least two control channels according to the at least two determined CORESETs or search space sets.

Optionally, the processor 600 is specifically configured to:
  determine, according to the first information configured by the network side device, the at least two CORESETs having the at least two QCL-Type D properties in different CORESET groups; or
  determine, according to the first information configured by the network side device, the at least two CORESETs having the at least two QCL-Type D properties in the same CORESET group, where the CORESET group includes multiple CORESETs with the same higher-layer parameter configuration; and
  determine, according to the first information configured by the network side device, the at least two same search space sets having the at least two QCL-Type D properties in the same CORESET; or determine, according to the first information configured by the network side device, the at least two different search space sets having the at least two QCL-Type D properties in the same CORESET.

Optionally, the at least two determined CORESETs include:

one CORESET in a first CORESET group of a first cell and one CORESET in a second CORESET group of the first cell; or a CORESET corresponding to a search space set of a second cell and one CORESET of the first cell, where the search space set of the second cell is a search space set with a lowest search space set index in the second cell; or at least two CORESETs with different QCL-Type D properties corresponding to multiple search space sets with the lowest index; or a CORESET corresponding to one search space set of the second cell and one CORESET of a third cell, where one CORESET of the third cell corresponds to a search space set associated with the search space set of the second cell or corresponds to a search space set with a lower cell index and/or search space set index value; or a CORESET corresponding to one search space set of a fourth cell and a CORESET corresponding to one search space set of a fifth cell, where one search space set of the fourth cell is a search space set with a lowest cell index and/or search space set index value among the search space sets having the association relationship, and one search space set of the fifth cell is a search space set associated with the search space set of the fourth cell or the search space set with the lower cell index and/or search space set index value.

Optionally, the at least two determined search space sets include:

one search space set of the second cell and one search space set of the third cell, where one search space set of the third cell is the search space set associated with the search space set of the second cell or the search space set with the lower cell index and/or search space set index value; or one search space set of the fourth cell and one search space set of the fifth cell, where one search space set of the fourth cell is the search space set with the lowest cell index and/or search space set index value among the search space sets having the association relationship, and one search space set of the fifth cell is the search space set associated with the search space set of the fourth cell or the search space set with the lower cell index and/or search space set index value.

Optionally, one search space set of the second cell includes:

the search space set with the lowest search space set index among the search space sets having the association relationship in the second cell, or the search space set with the lowest search space set index.

Optionally, one CORESET in the first CORESET group includes:

a CORESET corresponding to a USS set or CSS set with a lowest index in a first search space set, where the first search space set is at least one search space set associated with the first CORESET group of the first cell; and one CORESET in the second CORESET group includes:

a CORESET corresponding to a USS set or CSS set with a lowest index in a second search space set, where the second search space set is at least one search space set associated with the second CORESET group of the first cell.

Optionally, the first cell includes:

a cell with a lowest index among cells including two different CORESETPoolIndex values; or a cell with a highest index among the cells including the two different CORESETPoolIndex values; or all of cells including the two different CORESETPoolIndex values; or one cell preconfigured by the network side device.

Optionally, the second cell includes:

a cell with a lowest index among cells including a CSS set; or a cell with a lowest CSS set index or USS set index among all cells; or a cell with a lowest index among cells including a USS set.

Optionally, the association relationship includes:

an association relationship of CORESET indexes or search space indexes or TCI states among CORESETs of multiple slots; or an association relationship of CORESET indexes or search space indexes or TCI states among multiple CORESETs of the same slot.

Optionally, the processor 600 is specifically configured to:

determine a CORESET or search space set with one QCL-Type D property in a case that the network side device does not configure the first information for the terminal; or determine the CORESET or search space set with one QCL-Type D property in a case that the network side device configures second information for the terminal, where the second information is configured to indicate the terminal to monitor the CORESET or search space set with one QCL-Type D property.

Optionally, in the case that the network side device configures the second information for the terminal, the processor 600 is specifically configured to:

determine the CORESET or search space set with one QCL-Type D property according to part or all of: a cell index; CORESET group information; or a search space index.

Optionally, the control channel transmission pattern includes:

repeatedly transmitting the control channels in multiple slots, where each of the slots has a same search space or CORESET; or repeatedly transmitting the control channels in the CORESET, where the CORESET has at least one TCI state; or repeatedly transmitting the control channels in the CORESET within one slot or in multiple slots, where an offset between the CORESET and the search space is a fixed value.

Optionally, the first information includes an RRC signaling and/or an MAC CE signaling, and the RRC signaling and/or the MAC CE signaling is configured to indicate a CORESET or search space set that can be monitored.

Based on the same inventive concept, an embodiment of the present application further provides another terminal. Principles of the terminal for solving the problems are similar to that of the method for determining the transmission configuration indication of the embodiments of the present application, therefore, implementation of the terminal may refer to that of the method, and repetitions are omitted.

Figure 7:
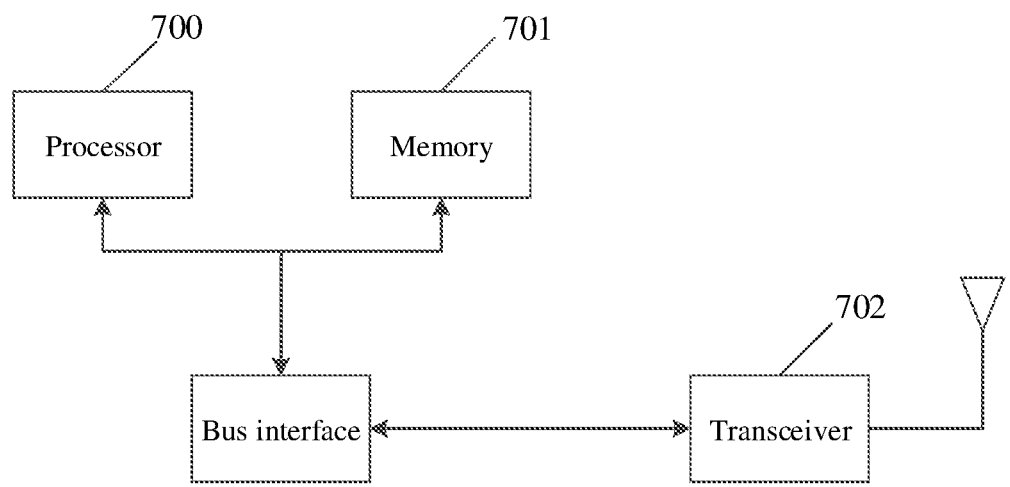
FIG. 7 is a schematic structural diagram of a second terminal provided by an embodiment of the present application.

As shown in FIG. 7, an embodiment of the present application provides a terminal, including: a processor 700, a memory 701, a transceiver 702 and a bus interface.

The processor 700 is responsible for managing a bus architecture and usual processing, and the memory 701 may store data used by the processor 700 during operation execution. The transceiver 702 is configured to receive and send data under control of the processor 700.

The bus architecture may include any quantity of interconnected buses and bridges, which are specifically linked together by various circuits of one or more processors represented by the processor 700 and a memory represented by the memory 701. The bus architecture may further link various other circuits such as a peripheral device, a voltage stabilizer and a power management circuit together, which are publicly known in the art and therefore are not further described herein. The bus interface provides an interface. The processor 700 is responsible for managing the bus architecture and usual processing, and the memory 701 may store data used by the processor 700 during operation execution.

A flow disclosed in the embodiments of the present application may be applied to the processor 700 or be implemented by the processor 700. In an implementation process, all steps of a signal processing flow may be completed through an integrated logic circuit of hardware in the processor 700 or in a software form. The processor 700 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiments of the present application. The general-purpose processor may be a microprocessor or any conventional processor, etc. The steps of the method disclosed in combination with the embodiment of the present application may be directly embodied as being executed and completed by a hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 701, and the processor 700 reads information in the memory 701, and is combined with its hardware to complete the steps of the signal processing flow.

Specifically, the processor 700 is configured to read a program in the memory 701 and execute:
  determining configuration information configured by a network side device for determining a TCI state; and
  determining one or two TCI states for transmitting all physical channels and/or physical signals within one time unit according to the configuration information, where a TCI state of each physical channel or physical signal is at least one of the one or two TCI states.

Optionally, the physical signals include a CSI-RS; and the one or two TCI states include part or all of:
  a TCI state associated with the CSI-RS; or
  a TCI state associated with a CORESET group, where the CORESET group is a CORESET group associated with the CSI-RS, or a CORESET group for triggering control signaling transmission of an aperiodic CSI-RS.

Optionally, the processor 700 is specifically configured to:
  determine an association relationship between the CSI-RS and a CORESET according to the configuration information; and
  determine the one or two TCI states for transmitting the CSI-RS within one time unit according to the association relationship.

Optionally, the physical channels include a PDCCH or PDSCH, the one or two TCI states include a TCI state associated with a CORESET group, and the CORESET group is a CORESET group associated with the PDCCH or PDSCH.

Optionally, the physical channels and/or the physical signals include a CSI-RS and at least one PDCCH. The one or two TCI states include:
  a combination of TCI states of the at least one PDCCH; and/or
  a TCI state of one PDCCH in the at least one PDCCH.

Optionally, the TCI state of one PDCCH in the at least one PDCCH includes:
  a TCI state of a PDCCH sent in a CORESET group associated with the CSI-RS.

Optionally, the one or two TCI states determined by the terminal include:
  the one or two TCI states, determined by the terminal, configured according to an RRC signaling; or
  the one or two TCI states, determined by the terminal, indicated according to a DCI signaling; or
  the one or two TCI states determined by the terminal according to a predefined rule.

Optionally, the one or two TCI states determined according to the predefined rule includes:
  a TCI state of at least two CORESETs monitored; or
  a TCI state of a CORESET with a lowest index among CORESETs with a search space in two CORESET groups monitored.

Optionally, all time units in one scheduling unit have one same state or two same TCI states; or
  each of time units in one scheduling unit has its own one or two TCI states.

Optionally, the time units include part or all of:
  a PDCCH monitoring symbol;
  a symbol with a PDSCH scheduling offset being less than a first threshold;
  a symbol with a PDSCH scheduling offset being greater than or equal to a second threshold; or
  symbols other than the PDCCH monitoring symbol in one scheduling unit.

Figure 8:
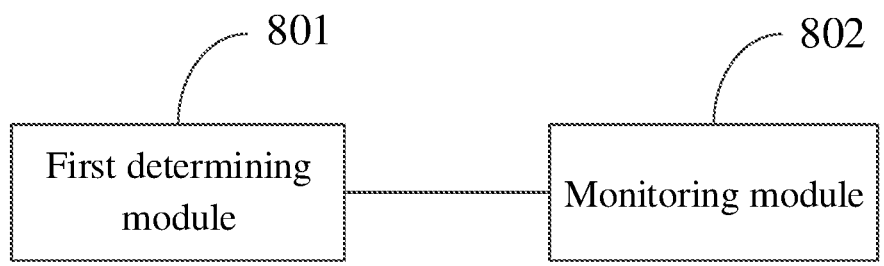
FIG. 8 is a schematic structural diagram of an apparatus for monitoring a control channel provided by an embodiment of the present application.

As shown in FIG. 8, an embodiment of the present application provides an apparatus for monitoring a control channel, including:
  a first determining module 801, configured to determine, according to first information configured by a network side device, at least two CORESETs or search space sets having at least two QCL-Type D properties, where the first information is configured to indicate a terminal to monitor the CORESETs or search space sets having the at least two QCL-Type D properties, or determine, according to a control channel transmission pattern configured by the network side device, at least two CORESETs or search space sets having an association relationship; and
  a monitoring module 802, configured to monitor the at least two control channels according to the at least two determined CORESETs or search space sets.

Optionally, the first determining module is configured to:
determine, according to the first information configured by the network side device, the at least two CORESETs having the at least two QCL-Type D properties in different CORESET groups; or
- determine, according to the first information configured by the network side device, the at least two CORESETs having the at least two QCL-Type D properties in the same CORESET group, where the CORESET group includes multiple CORESETs with the same higher-layer parameter configuration; and
- determine, according to the first information configured by the network side device, the at least two same search space sets having the at least two QCL-Type D properties in the same CORESET; or
- determine, according to the first information configured by the network side device, the at least two different search space sets having the at least two QCL-Type D properties in the same CORESET.

Optionally, the at least two determined CORESETs include:
- one CORESET in a first CORESET group of a first cell and one CORESET in a second CORESET group of the first cell; or
- a CORESET corresponding to a search space set of a second cell and one CORESET of the first cell, where the search space set of the second cell is a search space set with a lowest search space set index in the second cell; or
- at least two CORESETs with different QCL-Type D properties corresponding to multiple search space sets with the lowest index; or
- a CORESET corresponding to one search space set of the second cell and one CORESET of a third cell, where one CORESET of the third cell corresponds to a search space set associated with the search space set of the second cell or corresponds to a search space set with a lower cell index and/or search space set index value; or
- a CORESET corresponding to one search space set of a fourth cell and a CORESET corresponding to one search space set of a fifth cell, where one search space set of the fourth cell is a search space set with a lowest cell index and/or search space set index value among the search space sets having the association relationship, and one search space set of the fifth cell is a search space set associated with the search space set of the fourth cell or the search space set with the lower cell index and/or search space set index value.

Optionally, the at least two determined search space sets include:
- one search space set of the second cell and one search space set of the third cell, where one search space set of the third cell is the search space set associated with the search space set of the second cell or the search space set with the lower cell index and/or search space set index value; or
- one search space set of the fourth cell and one search space set of the fifth cell, where one search space set of the fourth cell is the search space set with the lowest cell index and/or search space set index value among the search space sets having the association relationship, and one search space set of the fifth cell is the search space set associated with the search space set of the fourth cell or the search space set with the lower cell index and/or search space set index value.

Optionally, one search space set of the second cell includes:
- the search space set with the lowest search space set index among the search space sets having the association relationship in the second cell, or the search space set with the lowest search space set index.

Optionally, one CORESET in the first CORESET group includes:
- a CORESET corresponding to a USS set or CSS set with a lowest index in a first search space set, where the first search space set is at least one search space set associated with the first CORESET group of the first cell; and
one CORESET in the second CORESET group includes:
- a CORESET corresponding to a USS set or CSS set with a lowest index in a second search space set, where the second search space set is at least one search space set associated with the second CORESET group of the first cell.

Optionally, the first cell includes:
- a cell with a lowest index among cells including two different CORESETPoolIndex values; or
- a cell with a highest index among the cells including the two different CORESETPoolIndex values; or
- all of cells including the two different CORESETPoolIndex values; or
- one cell preconfigured by the network side device.

Optionally, the second cell includes:
- a cell with a lowest index among cells including a CSS set; or
- a cell with a lowest CSS set index or USS set index among all cells; or
- a cell with a lowest index among cells including a USS set.

Optionally, the association relationship includes:
- an association relationship of CORESET indexes or search space indexes or TCI states among CORESETs of multiple slots; or
- an association relationship of CORESET indexes or search space indexes or TCI states among multiple CORESETs of the same slot.

Optionally, the first determining module 801 is further configured to:
- determine a CORESET or search space set with one QCL-Type D property in a case that the network side device does not configure the first information for the terminal; or
- determine a CORESET or search space set with one QCL-Type D property in a case that the network side device configures second information for the terminal, where the second information is configured to indicate the terminal to monitor the CORESET or search space set with one QCL-Type D property.

Optionally, in the case that the network side device configures the second information for the terminal, the first determining module 801 is specifically configured to:
- determine the CORESET or search space set with one QCL-Type D property according to part or all of: a cell index; CORESET group information; or a search space index.

Optionally, the control channel transmission pattern includes:
- repeatedly transmitting the control channels in multiple slots, where each of the slots has a same search space or CORESET; or
- repeatedly transmitting the control channels in the CORESET, where the CORESET has at least one TCI state; or repeatedly transmitting the control channels in the CORESET within one slot or in multiple slots, where an offset between the CORESET and the search space is a fixed value.

Optionally, the first information includes an RRC signaling and/or an MAC CE signaling, and the RRC signaling and/or the MAC CE signaling is configured to indicate a CORESET or search space set that can be monitored.

Figure 9:
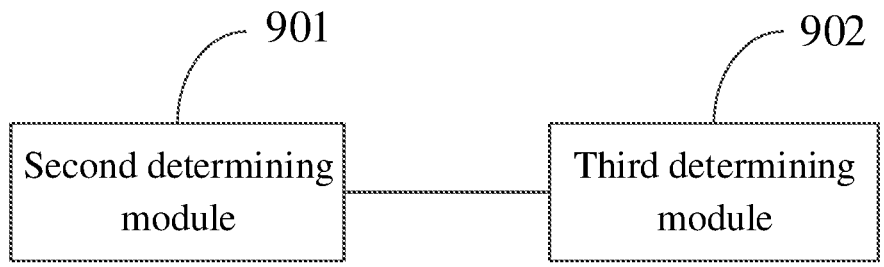
FIG. 9 is a schematic structural diagram of an apparatus for determining a transmission configuration indication provided by an embodiment of the present application.

As shown in FIG. 9, an embodiment of the present application provides an apparatus for determining a transmission configuration indication, including:

a second determining module 901, configured to determine configuration information configured by a network side device for determining a TCI state; and a third determining module 902, configured to determine one or two TCI states for transmitting all physical channels and/or physical signals within one time unit according to the configuration information, where a TCI state of each of the physical channels or physical signals is at least one of the one or two TCI states.

Optionally, the physical signals include a CSI-RS; and the one or two TCI states include part or all of:

a TCI state associated with the CSI-RS; or a TCI state associated with a CORESET group, where the CORESET group is a CORESET group associated with the CSI-RS, or a CORESET group for triggering control signaling transmission of an aperiodic CSI-RS.

Optionally, the physical signals include a CSI-RS, and the third determining module is specifically configured to:

determine an association relationship between the CSI-RS and a CORESET according to the configuration information; and determine the one or two TCI states for transmitting the CSI-RS within one time unit according to the association relationship.

Optionally, the physical channels include a PDCCH or PDSCH, the one or two TCI states include a TCI state associated with a CORESET group, and the CORESET group is a CORESET group associated with the PDCCH or PDSCH.

Optionally, the physical channels and/or the physical signals include a CSI-RS and at least one PDCCH. The one or two TCI states include:

a combination of TCI states of the at least one PDCCH; and/or a TCI state of one PDCCH in the at least one PDCCH.

Optionally, the TCI state of one PDCCH in the at least one PDCCH includes:

a TCI state of a PDCCH sent in a CORESET group associated with the CSI-RS.

Optionally, the one or two TCI states determined by the terminal include:

the one or two TCI states, determined by the terminal, configured according to an RRC signaling; or the one or two TCI states, determined by the terminal, indicated according to a DCI signaling; or the one or two TCI states determined by the terminal according to a predefined rule.

Optionally, the one or two TCI states determined according to the predefined rule includes:

a TCI state of at least two CORESETs monitored; or a TCI state of a CORESET with a lowest index among CORESETs with a search space in two CORESET groups monitored.

Optionally, all time units in one scheduling unit have one same state or two same TCI states; or each of time units in one scheduling unit has its own one or two TCI states.

Optionally, the time units include part or all of:

a PDCCH monitoring symbol;

a symbol with a PDSCH scheduling offset being less than a first threshold;

a symbol with a PDSCH scheduling offset being greater than or equal to a second threshold; or symbols other than the PDCCH monitoring symbol in one scheduling unit.

Further, an embodiment of the present application further provides a computer storage medium, where the computer storage medium stores a computer program instruction, and the instruction, when run on a computer, causes the computer to execute any one of the methods for monitoring the control channel, or any one of the methods for determining the transmission configuration indication.

The skilled in the art should understand that the embodiments of the present application may be provided as methods, systems or computer program products. Therefore, the present application can adopt forms of full hardware embodiments, full software embodiments, or embodiments combining software and hardware aspects. Moreover, the present application may adopt a form of the computer program products implemented on one or more computer available storage mediums (including but not limited to a disk memory, CD-ROM, an optical memory and the like) containing computer available program codes.

The present application is described with reference to flow diagrams and/or block diagrams of the methods, the devices (systems), and computer program products according to the present application. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, such that the instructions executed by the processor of the computer or other programmable data processing devices generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implements the functions specified in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions specified in one or more flows in the flow diagrams and/or one or more blocks in the block diagrams. Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. A method for monitoring a control channel, comprising:
determining, by a terminal according to first information configured by a network side device, at least two control resource sets (CORESETs) or search space sets having at least two Quasi-Co-Location Type D (QCL-Type D) properties, or determining, by the terminal according to a control channel transmission pattern configured by the network side device, at least two CORESETs or search space sets having an association relationship; and
monitoring, by the terminal, at least two control channels according to the at least two determined CORESETs or search space sets;
wherein the at least two determined CORESETs comprise:
a CORESET corresponding to a search space set of a second cell and one CORESET of a first cell, wherein the search space set of the second cell is a search space set with a lowest search space set index in the second cell; wherein the one CORESET of the first cell corresponds to a search space set associated with a search space set of the second cell; or
a CORESET corresponding to one search space set of a second cell and one CORESET of a third cell, wherein the one CORESET of the third cell corresponds to a search space set associated with the search space set of the second cell or corresponds to a search space set with a lower cell index and/or search space set index value; or
a CORESET corresponding to a first search space set of a second cell and one CORESET of a third cell, wherein the one CORESET of the third cell corresponds to a search space set associated with a second search space set of the second cell; wherein the first search space set of the second cell is a search space set with a lowest search space set index in the second cell; wherein the second search space set of the second cell is one of a plurality of search space sets corresponding to the CORESET of the second cell; or
a CORESET of a second cell and a CORESET of a third cell; wherein the CORESET of the third cell corresponds to a search space set associated with a search space set of the second cell; wherein the search space set of the second cell corresponds to the CORESET of the second cell; or
a CORESET corresponding to one search space set of a fourth cell and a CORESET corresponding to one search space set of a fifth cell, wherein the one search space set of the fourth cell is a search space set with a lowest cell index and/or search space set index value among the search space sets having the association relationship, and the one search space set of the fifth cell is a search space set associated with the search space set of the fourth cell or corresponds to a search space set with a lower cell index and/or search space set index value.

2. The method according to claim 1, wherein the determining, by the terminal according to the first information configured by the network side device, the at least two CORESETs having the at least two QCL-Type D properties, comprises:
determining, by the terminal according to the first information configured by the network side device, the at least two CORESETs having the at least two QCL-Type D properties in different CORESET groups; or
determining, by the terminal according to the first information configured by the network side device, the at least two CORESETs having the at least two QCL-Type D properties in a same CORESET group;
wherein the CORESET group comprises multiple CORESETs with a same higher-layer parameter configuration;
wherein the determining, by the terminal according to the first information configured by the network side device, the at least two search space sets having the at least two QCL-Type D properties, comprises:
determining, by the terminal according to the first information configured by the network side device, at least two same search space sets having the at least two QCL-Type D properties in a same CORESET; or
determining, by the terminal according to the first information configured by the network side device, at least two different search space sets having the at least two QCL-Type D properties in a same CORESET.

3. The method according to claim 1, wherein the at least two determined search space sets comprise:
one search space set of the second cell and one search space set of the third cell, wherein the one search space set of the third cell is the search space set associated with the search space set of the second cell or the search space set with the lower cell index and/or search space set index value; or
one search space set of the fourth cell and one search space set of the fifth cell, wherein the one search space set of the fourth cell is the search space set with the lowest cell index and/or search space set index value among the search space sets having the association relationship, and the one search space set of the fifth cell is the search space set associated with the search space set of the fourth cell or the search space set with the lower cell index and/or search space set index value;
wherein the one search space set of the second cell comprises:
the search space set with the lowest search space set index among the search space sets having the association relationship in the second cell, or the search space set with the lowest search space set index.

4. The method according to claim 1, wherein the one search space set of the second cell comprises:
the search space set with the lowest search space set index among the search space sets having the association relationship in the second cell, or the search space set with the lowest search space set index.

5. The method according to claim 1, wherein the one CORESET in the first CORESET group comprises:
a CORESET corresponding to a UE-specific search space (USS) set or common search space (CSS) set with a lowest index in a first search space set, wherein the first search space set is at least one search space set associated with the first CORESET group of the first cell;
wherein the one CORESET in the second CORESET group comprises:
a CORESET corresponding to a USS set or CSS set with a lowest index in a second search space set, wherein the second search space set is at least one search space set associated with the second CORESET group of the first cell.

6. The method according to claim 1, wherein the first cell comprises:

a cell with a lowest index among cells comprising two different CORESETPoolIndex values; or a cell with a highest index among cells comprising two different CORESETPoolIndex values; or all of cells comprising two different CORESETPoolIndex values; or one cell preconfigured by the network side device;

wherein the second cell comprises:

a cell with a lowest index among cells comprising a CSS set; or a cell with a lowest CSS set index or USS set index among all cells; or a cell with a lowest index among cells comprising a USS set.

7. The method according to claim 6, wherein the determining, by the terminal, the CORESET or search space set with one QCL-Type D property in the case that the network side device configures the second information for the terminal, comprises:

determining, by the terminal, the CORESET or search space set with one QCL-Type D property according to part or all of: a cell index; CORESET group information; or a search space index.

8. The method according to claim 1, wherein the association relationship comprises:

an association relationship of CORESET indexes or search space indexes or transmission configuration indication (TCI) states among CORESETs of multiple slots; or an association relationship of CORESET indexes or search space indexes or TCI states among multiple CORESETs of a same slot.

9. The method according to claim 1, further comprising:

determining, by the terminal, a CORESET or search space set with one QCL-Type D property in a case that the network side device does not configure the first information for the terminal; or determining, by the terminal, a CORESET or search space set with one QCL-Type D property in a case that the network side device configures second information for the terminal, wherein the second information is configured to indicate the terminal to monitor the CORESET or search space set with one QCL-Type D property.

10. The method according to claim 1, wherein the control channel transmission pattern comprises:

repeatedly transmitting the control channels in multiple slots, wherein each of the slots has a same search space or CORESET; or repeatedly transmitting the control channels in the CORESET, wherein the CORESET has at least one TCI state; or repeatedly transmitting the control channels in the CORESET within one slot or in multiple slots, wherein an offset between the CORESET and the search space is a fixed value.

11. The method according to claim 1, wherein the first information comprises a radio resource control (RRC) signaling and/or a media access control control element (MAC CE) signaling, wherein the RRC signaling and/or the MAC CE signaling is configured to indicate a CORESET or search space set that can be monitored.

12. A terminal, comprising a processor, a memory and a transceiver, wherein the processor is configured to read a program in the memory and execute:

determining, according to first information configured by a network side device, at least two control resource sets (CORESETs) or search space sets having at least two Quasi-Co-Location Type D (QCL-Type D) properties, or determining, according to a control channel transmission pattern configured by the network side device, at least two CORESETs or search space sets having an association relationship; and monitoring at least two control channels according to the at least two determined CORESETs or search space sets;

wherein the at least two determined CORESETs comprise:

a CORESET corresponding to a search space set of a second cell and one CORESET of a first cell, wherein the search space set of the second cell is a search space set with a lowest search space set index in the second cell; wherein the one CORESET of the first cell corresponds to a search space set associated with a search space set of the second cell; or a CORESET corresponding to one search space set of a second cell and one CORESET of a third cell, wherein the one CORESET of the third cell corresponds to a search space set associated with the search space set of the second cell or corresponds to a search space set with a lower cell index and/or search space set index value; or a CORESET corresponding to a first search space set of a second cell and one CORESET of a third cell, wherein the one CORESET of the third cell corresponds to a search space set associated with a second search space set of the second cell; wherein the first search space set of the second cell is a search space set with a lowest search space set index in the second cell; wherein the second search space set of the second cell is one of a plurality of search space sets corresponding to the CORESET of the second cell; or a CORESET of a second cell and a CORESET of a third cell; wherein the CORESET of the third cell corresponds to a search space set associated with a search space set of the second cell; wherein the search space set of the second cell corresponds to the CORESET of the second cell; or a CORESET corresponding to one search space set of a fourth cell and a CORESET corresponding to one search space set of a fifth cell, wherein the one search space set of the fourth cell is a search space set with a lowest cell index and/or search space set index value among the search space sets having the association relationship, and the one search space set of the fifth cell is a search space set associated with the search space set of the fourth cell or corresponds to a search space set with a lower cell index and/or search space set index value.

* * * * *